US010923953B2

(12) United States Patent
Port

(10) Patent No.: US 10,923,953 B2
(45) Date of Patent: Feb. 16, 2021

(54) RECEIVED WIRELESS POWER REGULATION

(71) Applicant: Apple Inc., Cupertino, CA (US)

(72) Inventor: Brendon Raymond Port, Auckland (NZ)

(73) Assignee: Apple Inc., Cupertino, CA (US)

( * ) Notice: Subject to any disclaimer, the term of this patent is extended or adjusted under 35 U.S.C. 154(b) by 454 days.

(21) Appl. No.: 15/523,905

(22) PCT Filed: Nov. 4, 2015

(86) PCT No.: PCT/NZ2015/050183
§ 371 (c)(1),
(2) Date: May 2, 2017

(87) PCT Pub. No.: WO2016/072865
PCT Pub. Date: May 12, 2016

(65) Prior Publication Data
US 2017/0338695 A1 Nov. 23, 2017

Related U.S. Application Data

(60) Provisional application No. 62/075,878, filed on Nov. 5, 2014, provisional application No. 62/076,714, filed
(Continued)

(51) Int. Cl.
*H02J 50/12* (2016.01)
*H04B 5/00* (2006.01)

(52) U.S. Cl.
CPC ............ *H02J 50/12* (2016.02); *H04B 5/0037* (2013.01)

(58) Field of Classification Search
CPC ................................. H02J 50/12; H02J 5/005
(Continued)

(56) References Cited

U.S. PATENT DOCUMENTS 4,833,337 A 5/1989 Kelley et al.
4,973,907 A 11/1990 Bergman et al.
(Continued)

FOREIGN PATENT DOCUMENTS

CN 101023600 A 8/2007
CN 101902083 A 12/2010
(Continued)

OTHER PUBLICATIONS

European Search Report from EP Application No. 15856790.9 dated Sep. 27, 2017 (8 pages).
(Continued)

*Primary Examiner* — Michael R. Fin
(74) *Attorney, Agent, or Firm* — Blank Rome LLP

(57) ABSTRACT

An inductive power receiver for an inductive power transfer system comprising: a power pick up stage including a receiving coil for receiving power transmitted by a transmitter; a load stage connected to the power pick up stage; a power regulation stage configured to provide a voltage in series with the power pick up stage wherein the voltage switches between at least a first amplitude and a second amplitude that is different from the first amplitude; and a controller configured to control the power regulation stage to regulate the power delivered to the load stage.

15 Claims, 26 Drawing Sheets

Related U.S. Application Data on Nov. 7, 2014, provisional application No. 62/109,552, filed on Jan. 29, 2015, provisional application No. 62/237,481, filed on Oct. 5, 2016.

(58) Field of Classification Search
USPC .................................................... 307/104
See application file for complete search history.

(56) References Cited

U.S. PATENT DOCUMENTS

| | | | |
|---|---|---|---|
| 5,702,431 A | 12/1997 | Wang et al. | |
| 5,734,258 A | 3/1998 | Esser | |
| 6,515,878 B1 | 2/2003 | Meins et al. | |
| 6,701,121 B2 | 3/2004 | Nami et al. | |
| 7,952,900 B2 | 5/2011 | Tomiyoshi et al. | |
| 8,093,758 B2 | 1/2012 | Hussmann et al. | |
| 8,406,014 B2 | 3/2013 | Liu et al. | |
| 8,791,601 B2 | 7/2014 | Furukawa | |
| 8,836,228 B2 | 9/2014 | Ming | |
| 9,755,423 B2 * | 9/2017 | Sandner | H02H 7/1252 |
| 2007/0237273 A1 | 10/2007 | Tan et al. | |
| 2008/0235869 A1 | 10/2008 | Matsuo | |
| 2010/0171368 A1 | 7/2010 | Schatz et al. | |
| 2011/0053500 A1 | 3/2011 | Menegoli et al. | |
| 2011/0069516 A1 | 3/2011 | Greene et al. | |
| 2011/0090723 A1 | 4/2011 | Hu et al. | |
| 2011/0105023 A1 | 5/2011 | Scheer et al. | |
| 2011/0116290 A1* | 5/2011 | Boys | H02J 50/12 363/65 |
| 2011/0254377 A1 | 10/2011 | Wildmer et al. | |
| 2011/0254379 A1 | 10/2011 | Madawala | |
| 2012/0170337 A1 | 7/2012 | Lisi et al. | |
| 2012/0235636 A1* | 9/2012 | Partovi | H02J 7/025 320/108 |
| 2012/0267960 A1 | 10/2012 | Low et al. | |
| 2012/0313444 A1* | 12/2012 | Boys | H02J 50/12 307/104 |
| 2013/0119929 A1 | 5/2013 | Partovi | |
| 2013/0272044 A1 | 10/2013 | Boys et al. | |
| 2014/0028108 A1 | 1/2014 | Hsu | |
| 2014/0035382 A1 | 2/2014 | Covic et al. | |
| 2014/0042821 A1* | 2/2014 | Boys | H02J 5/005 307/104 |
| 2014/0152117 A1 | 6/2014 | Sankar | |
| 2014/0175894 A1 | 6/2014 | Endo | |
| 2014/0225450 A1 | 8/2014 | Endo et al. | |
| 2014/0306545 A1* | 10/2014 | Robertson | H02J 50/12 307/104 |
| 2015/0015087 A1 | 1/2015 | Endo et al. | |
| 2015/0295418 A1* | 10/2015 | Ren | H02J 5/005 307/104 |
| 2017/0358954 A1* | 12/2017 | Ren | H02M 3/33576 |

FOREIGN PATENT DOCUMENTS

| | | |
|---|---|---|
| CN | 103733488 A | 4/2014 |
| CN | 103746462 A | 4/2014 |
| CN | 103944388 A | 7/2014 |
| EP | 0609964 | 8/1994 |
| EP | 1609501 | 12/2005 |
| JP | 2000184625 | 6/2000 |
| JP | 2001238372 A | 8/2001 |
| JP | 2005168246 A | 6/2005 |
| JP | 2009201211 | 9/2009 |
| JP | 2009539343 A | 11/2009 |
| JP | 2011205761 | 10/2011 |
| JP | 2012060850 A | 3/2012 |
| JP | 2012130173 A | 7/2012 |
| JP | 2014521289 A | 8/2014 |
| TW | 201310848 A | 3/2013 |
| WO | 2004105208 A1 | 12/2004 |
| WO | 2008039945 A2 | 4/2008 |
| WO | 2009091267 A2 | 7/2009 |
| WO | 2010030195 A1 | 3/2010 |
| WO | 2011142440 A1 | 11/2011 |
| WO | 2011145953 | 11/2011 |
| WO | 2012078055 A1 | 6/2012 |
| WO | 2012164845 A1 | 12/2012 |
| WO | 2013006068 A1 | 1/2013 |
| WO | 2013080212 A2 | 6/2013 |
| WO | 2014040975 A2 | 3/2014 |
| WO | 2014070025 A2 | 5/2014 |
| WO | 2014125392 | 8/2014 |
| WO | 2016072865 | 5/2016 |

OTHER PUBLICATIONS

Boonyaroonate et al., "Analysis and Design of Class E Isolated DC/DC Converter Using Class E Low dv/dt PWM Synchronous Recrifier", IEEE Transactions on Power Electronics, Institute of Electrical and Electronics Engineers, USA, vol. 16, No. 4, Jul. 1, 2002 (Jul. 1, 2001), XP011043568, ISSN: 0885-8993.

Luk et al., "State-Space Modeling of a Class Ed Converter for Inductive Links", IEEE Transactions on Power Electronics. Institute of Electrical and Electronics Engineers, USA, vol. 30, No. 6, Jun. 24, 2014 (Jun. 24, 2014), pp. 3242-3251, XP011570281, ISSN: 0885-8993, DOI: 10.1103/TPEL.2014.2332451 [retrieved on Jan. 16, 2015].

Hirota et al., "Pratical evaluations of single-ended load resonant inverter using application-specific heating appliance", Power Electronics and Drive Systems, 1995., Proceedings of the 1995 Intern Ational Conference on Singapore 21-24 Feb. 1, New Your, NY, USA, IEEE, Feb. 21, 1995 (Feb. 21, 1995), pp. 531-537, XP010140703, DOI: 10.1109/PEDS.1995.404866, ISBN: 987-0-8703-2423-7.

Terai et al, "Comparative performance evaluations of IGBT's and MCT incorporated into voltage-source-type single-ended quasi-resonant zero-voltage soft switching inverter", Electrical Engineering in Japan, vol. 144, No. 3, Aug. 1, 2003 (Aug. 1, 2003), pp. 58-68, XP055504116, US ISSN: 0424-7760, DOI: 10.1002/eej. 10151.

Omori et el., A new resonant IPT-wireless EV charging system with single-ended quasi-resonant inverter for home use, 2013 IEEE 14th Workshop on Control and Modeling for Power Electronics (Compel). IEEE, Jun. 23, 2013 (Jun. 23, 2013), pp. 1-7, XP032500858, ISSN: 1093-5142, DOI: 10.1109/COMPEL.2013.6626448 [retrieved on Oct. 9, 2013].

International Search Report for International Application No. PCT/NZ2015/050183 dated Feb. 4, 2016 (3 pages).

International Written Opinion for International Application No. PCT/NZ2015/050183 dated Feb. 4, 2016 (4 pages).

\* cited by examiner

RECEIVED WIRELESS POWER REGULATION

This application is a National Stage Application of PCT/NZ2015/050183, filed 4 Nov. 2015, which claims benefit of: U.S. Ser. No. 62/075,878, filed 5 Nov. 2014; U.S. Ser. No. 62/076,714, filed 7 Nov. 2014; U.S. Ser. No. 62/109,552, filed 29 Jan. 2015; and U.S. Ser. No. 62/237,481, filed 5 Oct. 2015, all of which applications are incorporated herein by reference. To the extent appropriate, a claim of priority is made to each of the above disclosed applications.

FIELD

This invention relates generally to regulating the power provided to a load in an inductive power transfer system.

BACKGROUND

IPT technology is an area of increasing development and IPT systems are now utilised in a range of applications and with various configurations. Typically, a primary side (i.e., an inductive power transmitter) will include a transmitting coil or coils configured to generate an alternating magnetic field. This magnetic field induces an alternating current in the receiving coil or coils of a secondary side (i.e., an inductive power receiver). This induced current in the receiver can then be provided to some load, for example, for charging a battery or powering a portable device. In some instances, the transmitting coil(s) or the receiving coil(s) may be suitably connected with capacitors to create a resonant circuit. This can increase power throughput and efficiency at the corresponding resonant frequency.

SUMMARY

The present invention may provide an improved apparatus and method for regulating the power provided to the load of an IPT receiver or may at least provide the public with a useful choice.

According to one exemplary embodiment there is provided an inductive power receiver for an inductive power transfer system comprising:
  a power pick up stage including a receiving coil for receiving power transmitted by a transmitter;
  a load stage connected to the power pick up stage;
  a power regulation stage configured to provide an equivalent voltage in series with the power pick up stage wherein the equivalent voltage switches between at least a first amplitude and a second amplitude that is different from the first amplitude; and
  a controller configured to control the power regulation stage to regulate the power delivered to the load stage.

According to another exemplary embodiment there is provided an inductive power receiver for an inductive power transfer system comprising:
  a power pick up stage including a receiving coil, a capacitor and a switch;
  a power regulation stage; and
  a controller configured to control the switch to maintain a parameter of the power regulation stage within a range.

According to yet another exemplary embodiment there is provided a method of controlling an inductive power receiver for an inductive power transfer system comprising:
  generating an voltage in series with a pick-up coil of the receiver; and
  controlling the voltage phase to substantially match AC power received in the pick-up coil from a transmitter.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION

A problem associated with IPT systems is regulating the amount of power provided to the load. It may be useful to regulate the power provided to the load to ensure the power is sufficient to meet the load's power demands.

Similarly, it may be useful that the power provided to the load is not excessive, which may lead to inefficiencies. Generally, there are two approaches to power control in IPT systems: transmitter-side power control and receiver-side power control.

In transmitter-side power control, the transmitter is typically controlled to adjust the power of the generated magnetic field (for example, by adjusting the power supplied to the transmitting coil(s)).

In receiver-side power control, the receiver is controlled to adjust the power provided to the load from the receiving coils (for example, by including a regulating stage or by adjusting the tuning of the receiver).

A problem that may be associated with some receiver-side power control systems that rely on regulating stages is that such regulating stages will often need to include components, such as DC inductors acting as an energy store so that power can be suitably regulated which can be relatively large in terms of volume, which cannot be readily miniaturized so that the receiver may fit within portable electronic devices.

Another common problem with receivers used in IPT systems is that variations in the operating frequency of the transmitter or resonant frequency of the receiver (due to, for example, changes in load or other circuit parameters), can affect the amount and efficiency of power transfer.

One approach may be a voltage generator which feeds voltage to the AC side of a pick-up coil so as to be added to the induced voltage to control power flow. However, if this generated voltage is created with a three phase full-bridge circuit connected in parallel and only one capacitor, then each phase voltage is not entirely free to vary. It may also not be applicable to a single phase solution.

Figure 1:
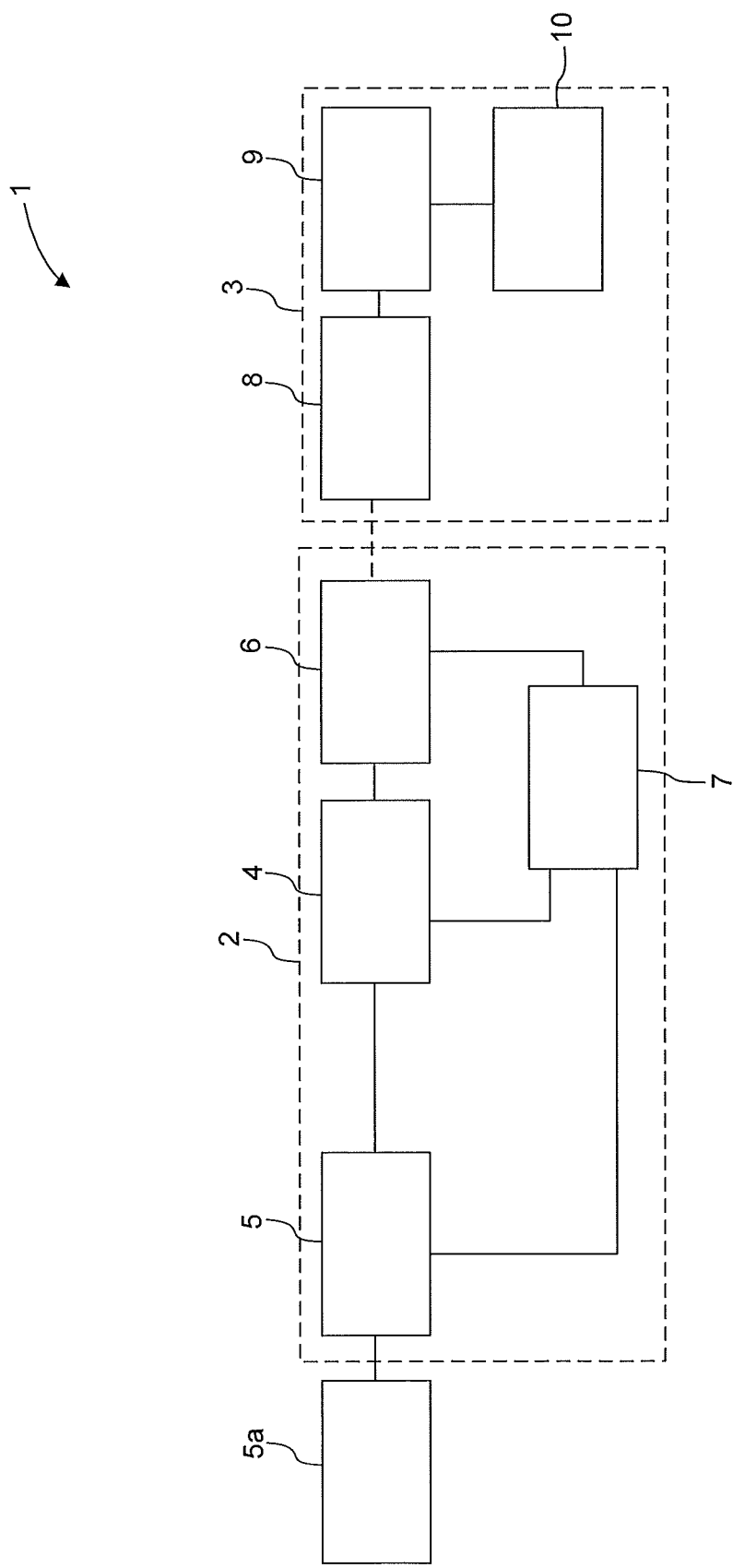
FIG. 1 is a schematic diagram of an inductive power transfer system according to one embodiment.

FIG. 1 shows a representation of an inductive power transfer (IPT) system 1 according to an example embodiment. This representation is intended to be general representation so as to introduce different parts of the IPT system that will be described in more specific detail in relation to later figures. This may be suitably modified or supplemented for particular embodiments according to the application. The IPT system includes an inductive power transmitter 2 and an inductive power receiver 3.

The transmitter 2 includes a converter 4 that is connected to an appropriate power supply. In FIG. 1 the power supply is shown as a DC-DC converter 5 that is connected to a DC power supply 5a, however other arrangements are possible. The converter may be a non-resonant half bridge converter or any other converter adapted for the particular IPT system, such as a push-pull converter. The converter is configured to output an alternating current of desired frequency and amplitude. The voltage of the output of the converter may also be regulated by the converter, the DC-DC converter or combination of both.

The converter 4 is connected to transmitting coil(s) 6. The converter supplies the transmitting coil(s) 6 with an alternating current such that the transmitting coil(s) 6 generates a time-varying magnetic field with a suitable frequency and amplitude. In some configurations, the transmitting coil(s) may also be considered to be an integral part of the converter, but for the sake of clarity this description will refer to them as distinct.

The transmitting coil(s) 6 may be any suitable configuration of coils, depending on the characteristics of the magnetic field that are required in a particular application and the particular geometry of the transmitter. In some IPT systems, the transmitting coils may be connected to capacitors (not shown) to create a resonant circuit. Where there are multiple transmitting coils, these may be selectively energised so that only transmitting coils in proximity to suitable receiving coils are energised. In some IPT systems, it may be possible that more than one receiver may be powered simultaneously. In IPT systems, where the receivers are adapted to control the power provided to the load (as, for example, in the embodiments in more detail below), the multiple transmitting coils may be connected to the same converter. This has the benefit of simplifying the transmitter as it does not need to control each transmitting coil separately. Further, it may be possible to configure the transmitter so that it regulates the power provided to the transmitting coils to a level dependent on the coupled receiver with the highest power demands.

FIG. 1 also shows a controller 7 within the transmitter 2. The controller can be connected to each part of the transmitter. The controller is adapted to receive inputs from each part of the transmitter and produce outputs that control the way each part of the transmitter operates. The controller may include a memory. The controller may be a programmable logic controller that is programmed to perform different computational tasks depending on the requirements of the IPT system.

The receiver 3 includes power receiving circuitry 8, which includes one or more receiver coils, suitably connected to power conditioning circuitry 9 that in turn supplies power to a load 10. The power conditioning circuit is configured to convert current induced in the receiver coils into a form that is appropriate for the load. As will be appreciated, the power receiver 3 receives inductive power from the power transmitter 2 and provides the power to the load. The load may be any suitable load depending upon the application for which the inductive power receiver is being used. For example, the load may be powering a portable electronic device or the charging of a battery. The power demands of a load may vary, and therefore it is important that the power provided to the load matches the load's power demands. In particular, the power must be sufficient to meet the power demands whilst not being too excessive (which may lead to inefficiencies). Accordingly, the power conditioning circuitry includes any circuitry that may be necessary for the operation of the inductive power receiver 3. The power conditioning circuitry may include rectifiers, regulators, smoothing circuits and control circuits.

Figure 2A:
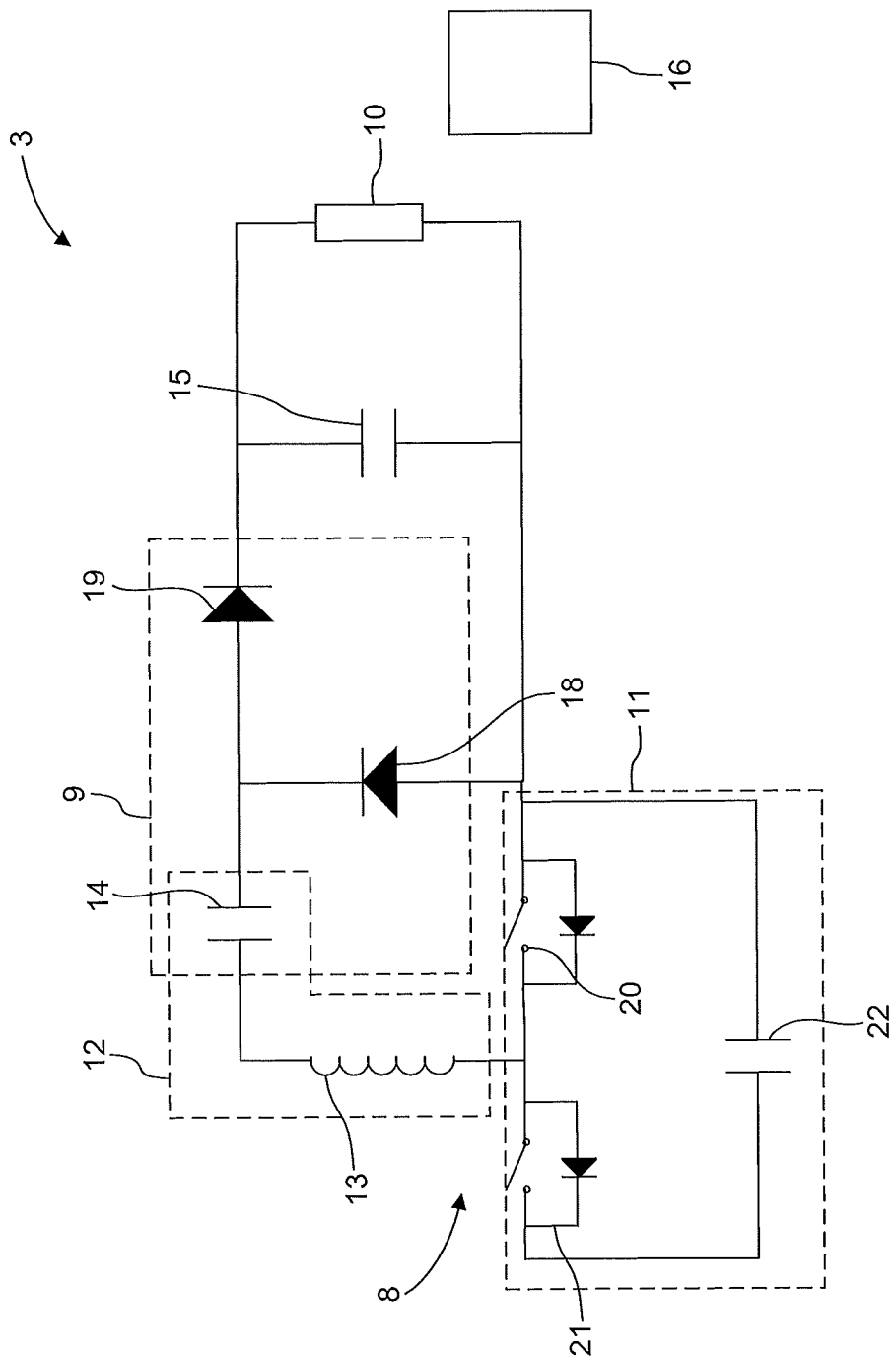
FIG. 2($a$)-($b$) are circuit diagrams of inductive power receivers according to two embodiments.

FIG. 2a illustrates an example embodiment of the power receiver 3. The power receiving circuitry 8 of the receiver includes a power regulation circuit 11 and a resonant circuit 12. The resonant circuit 12 has a receiving coil 13 (shown as an inductor coil) and a resonance capacitor 14. It is noted that the receiver 3 may not have a resonant circuit, and may just include a power receiving coil. The load 10 is shown as connected to a DC smoothing capacitor 15. As can be seen, the receiver 3 has the regulator (i.e., the power regulation circuit) before the rectifier (i.e., the power conditioning circuit 9) and the coil, rather than after the rectifier as is typical in conventional secondary side power flow control configurations. The advantages of this novel configuration will become apparent from the following description.

The receiver also includes a controller 16. The receiver controller may be connected to each part of the inductive power receiver. The receiver controller may be configured to receive inputs from parts of the inductive power receiver and produce outputs that control the operation of each part.

The receiver controller may be implemented as a single unit or separate units. The receiver controller may be a programmable logic controller or similar controller that is programmed to perform different computational tasks depending on the requirements of the inductive power receiver (as described in detail later). The receiver controller may be configured to control various aspects of the inductive power receiver depending on its capabilities, including for example: power flow (as will be described in more detail later), tuning, selectively enabling receiving coils, and/or communications.

The term "coil" used herein may include an electrically conductive structure where an electrical current generates a magnetic field. For example inductive "coils" may be electrically conductive wire in three dimensional shapes or two dimensional planar shapes, electrically conductive material fabricated using printed circuit board (PCB) techniques into three dimensional shapes over plural PCB 'layers', and other coil-like shapes, having two or more connections, e.g., three connections could be provided using a centre tapped coil. The use of the term "coil", in either singular or plural, is not meant to be restrictive in this sense. Other configurations may be used depending on the application.

Referring to the resonant circuit 12, the receiving coil 13 and resonant capacitor 14 are connected in series (i.e., the resonant circuit is 'series-resonant'). The coils of the resonant circuit receives power from a time-varying magnetic field generated by the transmitter 2 to produce an AC output. The values of the receiving coil and resonance capacitor may affect the resonant frequency of the receiver, and the receiving coil and resonance capacitor may be selected so as to resonate at the operating frequency of the transmitter or any other suitable frequency, e.g., the receiver may be 'mis-tuned' to the transmitter frequency so that active tuning in the receiver can bring the IPT system into tune. Other considerations may also influence the type and size of the receiving coil and resonant capacitor used in the receiver, for example, the dimensions of the receiver or device in which the receiver is used, or the required power.

It will also be appreciated that in some embodiments, it may be desirable to have additional inductors and/or capacitors (not shown) included in the receiver resonant circuit. For simplicity, the inductive power receiver 3 is shown with one receiver resonant circuit 12. However, in other embodiments there may be multiple receiver resonant circuits. For example, in some portable devices there may be receiving coils located on different parts of the portable device. Such receiver resonant circuits may all be connected to the same power regulation and conditioning circuitry, or they may each be connected with an associated receiver circuitry, such as, multiple inverters either driven in-phase or out-of-phase to provide a multiphase system. It may be possible to selectively enable each or some of the receiver resonant circuits and/or receiving coils.

The resonant circuit 12 is connected to the power conditioning circuitry 9 which includes the resonance capacitor 14 from the resonant circuit 12 and two (asymmetric) current flow devices 18,19 connected in a rectifier configuration. The rectifier configuration is shown as half-bridge, however other configurations are possible such as full-bridge as described in more detail below. This half-bridge implementation is connected such that the power conditioning circuit 9 has a shared AC and DC ground. For the sake of clarity, the rest of this description will refer to the asymmetric flow device 18 that is generally in parallel with the resonant circuit 12 as the 'first' and will refer to the asymmetric flow device 19 that is generally in series with the load as 'second'.

In FIG. 2a, the asymmetric current flow devices are diodes. The position and orientation of the diodes is such that the AC input into the power conditioning circuitry 9 is rectified to produce a DC output. In all examples of the rectifier asymmetric current flow devices may be used instead of the diodes, e.g., controlled switches or a combination of any suitable asymmetric current flow devices (such as diodes or controlled switches) may be used. Controlled switches may provide improved performance over diodes but they must be controlled so that they are switched off when they need to prevent the flow of current. Possible controlled switches that may be used include any suitable transistors such as MOSFETs, IGBTs or BJTs.

Figure 2B:
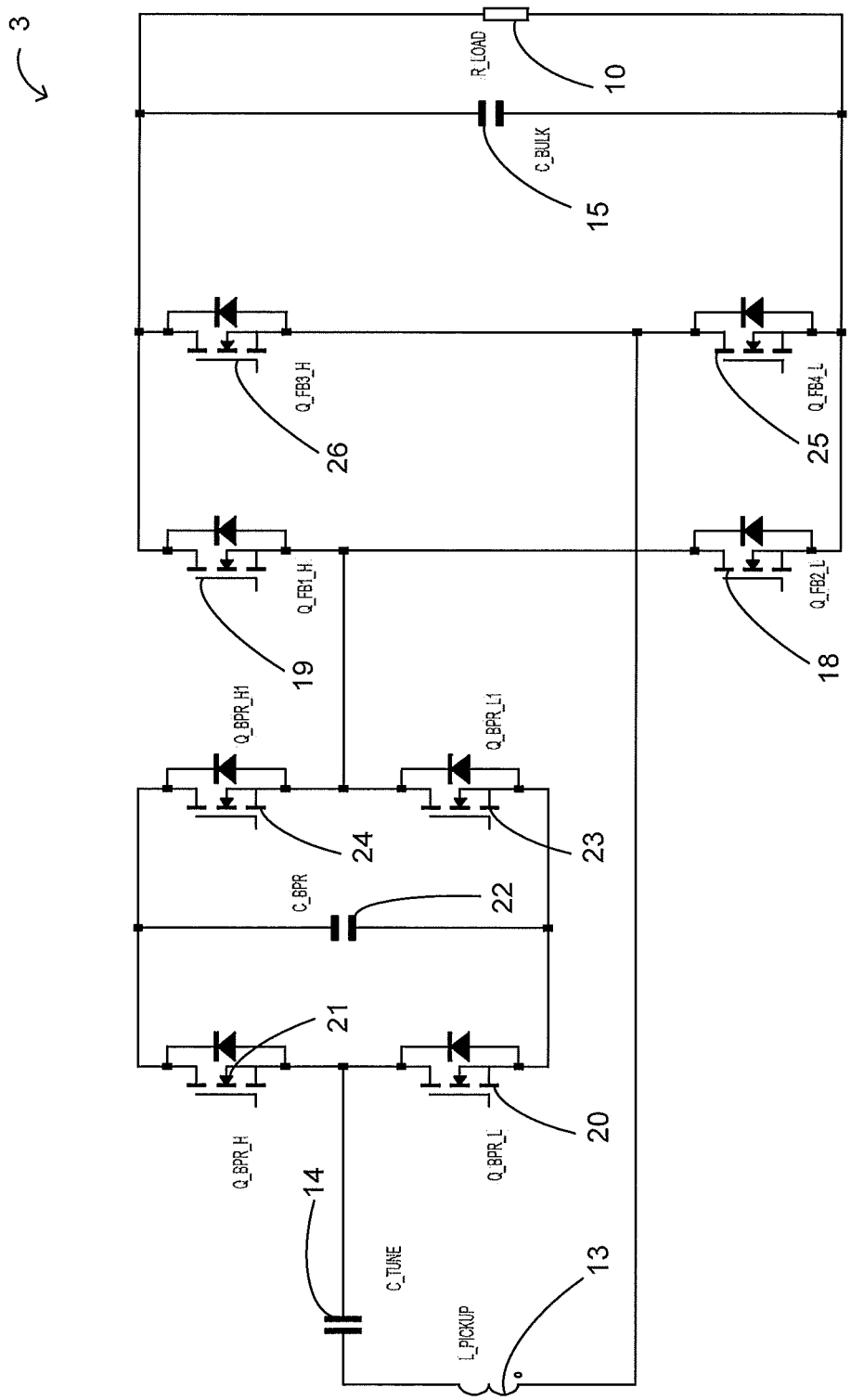

The power regulation circuit 11 of the power receiving circuitry 8 has two power control switches 20,21 and a control capacitor 22 configured so as to regulate the power within the receiver 3. For the sake of clarity, the rest of this description will refer to the control switch 20 as the 'first' and will refer to the control switch 21 as 'second'. The first and second power control switches 20,21 may be a transistor such as a MOSFET, IGBT or BJT, which may include a body diode as illustrated. A full bridge configuration is also applicable. A possible full bridge embodiment of the power regulation circuitry 11 and the inductive power receiver 3 is shown in FIG. 2b, which further includes a third power control switch 23, a fourth power control switch 24, a third asymmetric flow device 25 and a fourth asymmetric flow device 26. The polarities and connections of the power control switches 20,21,23,24 in the full bridge embodiment should be noted as they are different to a standard H-bridge circuit.

The power control switches 20,21 are controlled by the controller 16. The controller 16 is configured to receive inputs from parts of the inductive power receiver 3, which can include the current and voltage being supplied to the load 10. The controller 16 may also be provided with the power requirements of the load 10 by inputs or any other suitable means. The controller will control the power control switches 20,21 so as to regulate the power provided to the load 10.

As discussed earlier, it is also desirable in IPT systems to have secondary side regulation to allow an inductive power receiver 3 to pick-up power from an uncontrolled magnetic field or to allow two or more inductive power receivers 3 to pick-up different amounts of power from the same magnetic field. Of the many conventional methods to achieve secondary side regulation, some are very simple and some are very complex. One effective and simple approach is a synchronous rectifier combined with a switch mode DC-DC converter. A disadvantage of this approach is that it requires an additional high current inductor (for high loading) and has switching losses associated with the buck conversion. With secondary side regulation it is important to keep the inductive power receiver 3 losses as low as possible while still producing as much or as little power as is required by the load 10. The design of the power conditioning circuitry 9 and the method used to control this may reduce the need for a regulator after the rectifier, and also therefore also reduce the need for an external inductor, thereby minimizing power loss and reducing the cost of the inductive power receiver 3 and IPT system 1.

A voltage is generated in series with the receiving coil 13 in order to control power flow. This voltage source is created by the (half-bridge) power regulation circuit 11. The voltage across the control capacitor 22, which is also referred to as the "high rail DC bus voltage" or as the "series cancellation voltage", is free to vary completely independently from the output voltage across the load 10. This high rail DC bus voltage usually varies in proportion to the reflected transmitter voltage at the resonant circuit (otherwise known as the "open circuit voltage" or $V_{OC}$). The high rail DC bus voltage can vary down to zero or even to a negative voltage depending on the type of switching device used for the power control switches 20,21. Because the power regulation circuit 11 generates an AC voltage, a 180 degree shift in this AC voltage is equivalent to having a negative voltage across the control capacitor 22. The voltage generated at the output of the power regulation circuit 11 need not reverse polarity. It may be a square wave going between 0V and the high rail DC bus voltage. So the voltage output of the power regulation circuit 11 may be a periodically varying waveform with a fundamental frequency that is on average the same as the transmitter operating frequency.

Figure 3:
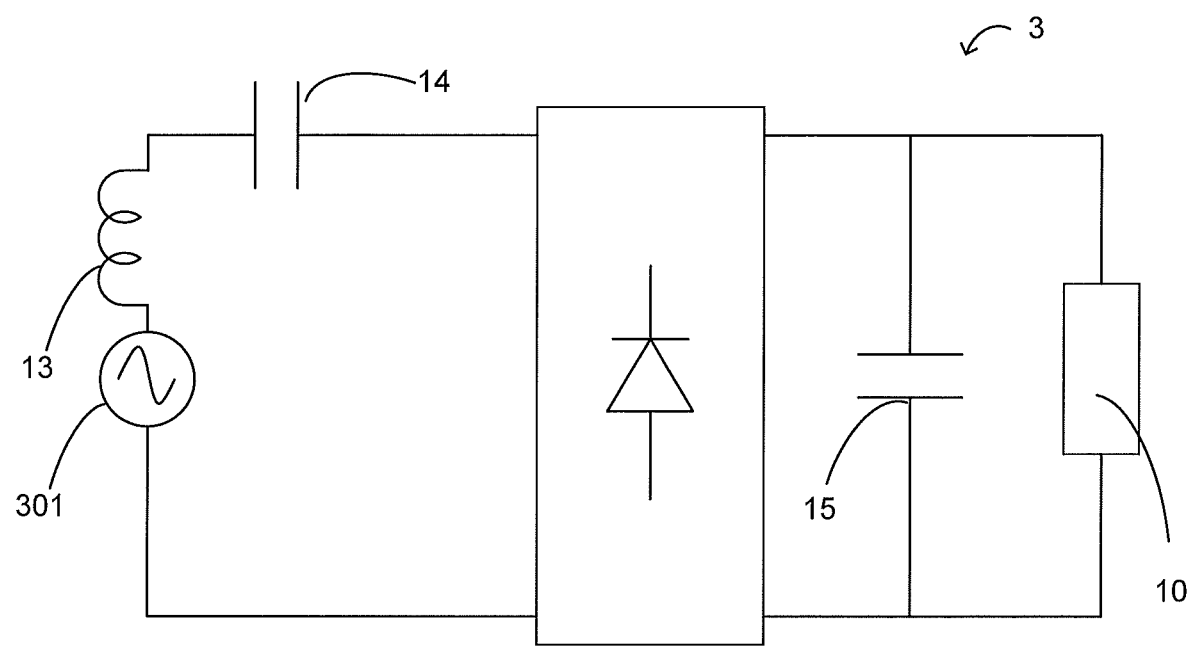
FIG. 3 is a simplified model of a basic receiver system.

In FIG. 3, a basic inductive power receiver 3 is illustrated as an approximate simplified model in which the voltage across the transmitting coil(s) 6 can be reflected into the receiving coil 13 as a voltage source in series with the receiving coil 13. This voltage is also known as the "open circuit voltage" and can be denoted $V_{OC}$ 301. $V_{OC}$ 301 is the voltage that would appear across the receiving coil 13 were it disconnected from the rest of the circuit. In this unregulated example, the output voltage to the load 10 will be proportional to $V_{OC}$ 301 and also somewhat dependant on the current drawn by the load 10. Because of this, the output voltage at the load 10 is not constant with changes in the load or changes in the transmitter power or frequency.

Figure 4:
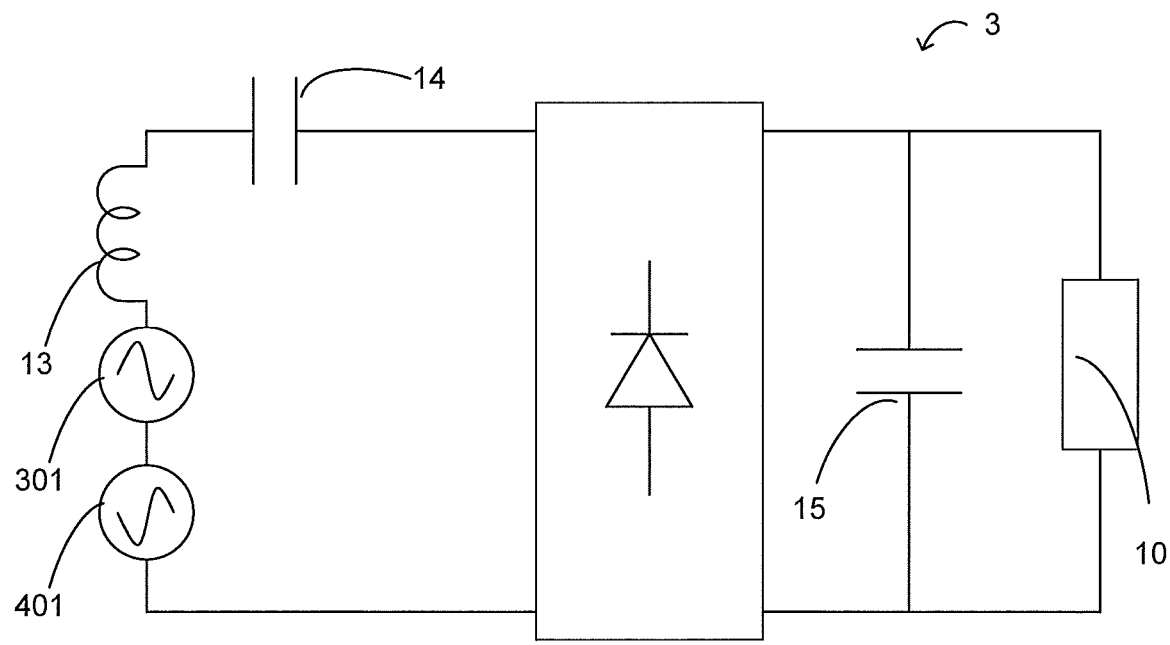
FIG. 4 is a simplified model of a receiver system that has a created voltage source.

In FIG. 4, the inductive power receiver 3 is illustrated in conceptual form. In order to control and regulate the output voltage at the load 10, a created voltage 401 is made on the AC side (i.e., before rectification). The phase and amplitude this created voltage 401 can be adjusted to entirely cancel $V_{OC}$ 301, reinforce $V_{OC}$ 301, or to do anything in-between, that is, regulate. Cancelling $V_{OC}$ 301 results in minimum output power at the load 10 and reinforcing $V_{OC}$ 301 results in maximum output power at the load 10. Accordingly, the output voltage to the load 10 is (indirectly) controlled and regulated to a fixed voltage. The second voltage source could be created in any number of ways, but a simple and efficient method is needed for this to be a useful approach.

Figure 5:
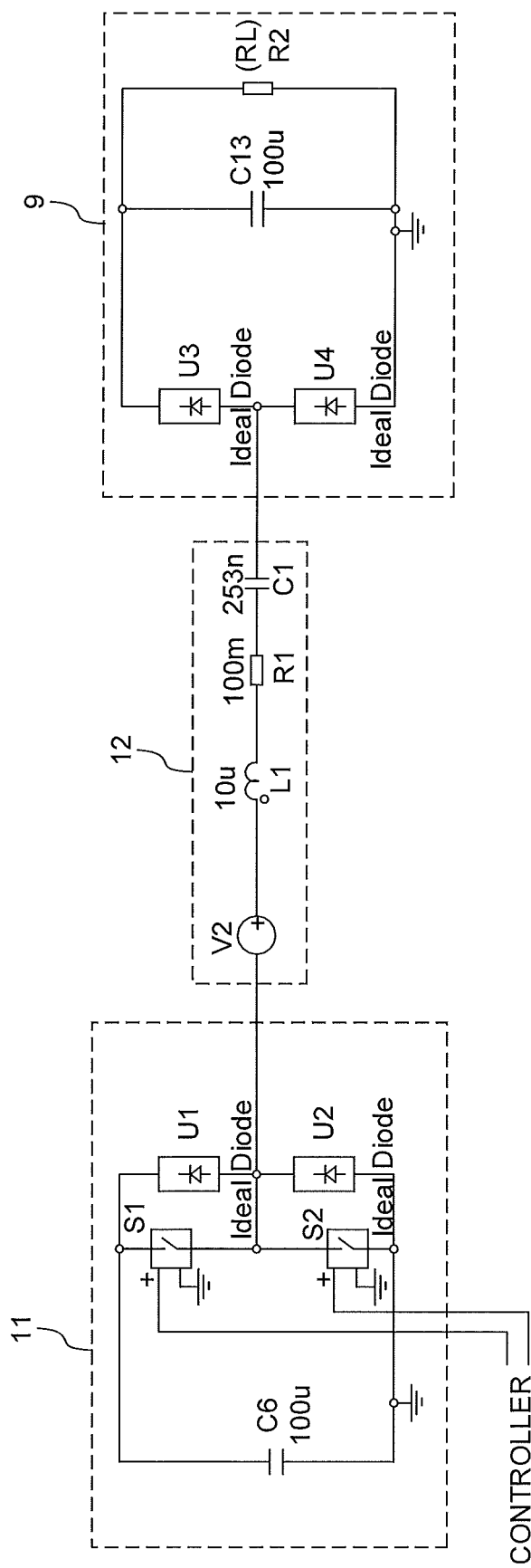
FIG. 5 is a schematic diagram of the receiver of an embodiment.

FIG. 5 is a schematic example of the inductive power receiver 3 illustrated in FIG. 2a and FIG. 4. Voltages in the power regulation circuit 11 must be free to vary independently from the output voltage across the load 10. The voltages in the power regulation circuit 11 must be free to reach a positive (or negative) voltage proportional to the reflected transmitter voltage, $V_{OC}$ 301. The high rail DC bus voltage would usually not be driven from the output voltage on the right hand side (i.e., rectifier 9) of the resonant circuit 12 (e.g., about 5V). Because the left hand side (i.e., power regulation circuit 11) voltage is allowed to vary, this right hand side voltage can be fixed, e.g., at about 5V. By using suitable switching control on the left hand side half-bridge, it is possible to achieve phase/amplitude control of the created voltage as desired.

Superficially, the configuration of the inductive power receiver 3 may appear to be similar to a phase controlled rectifier system wherein the series tuned power receiving circuitry 8 is connected directly to a full bridge controlled rectifier, with the timing of the rectifier switches phase shifted from the normal timing that would be used were it a standard synchronous rectifier. However there are some fundamental differences. Firstly, in a phase controlled rectifier system the phase of the rectifier is changed to achieve regulation whereas in the present inductive power receiver 3 two sections (the power regulation circuit 11 and the power conditioning circuitry 9 which may include a rectifier) may operate independently with different phasing. Both the phase and the voltage of these two sections can be independent of each other and of the output voltage. Secondly, the voltage used in a phase controlled rectifier system to regulate the output voltage is the output voltage itself, that is, there is no additional independent voltage used on the AC side like in the inductive power receiver 3 of the present invention. Accordingly, the inductive power receiver 3 of the present invention may control the DC output voltage across the load 10 indirectly by feeding a signal into the AC part of the receiver.

Many conventional regulation approaches will generate an intermediate voltage (that is free to vary independently of the output voltage) which is then directly regulated (with something like a switch mode converter or a simple LDO) to then generate a controlled output voltage. The inductive power receiver 3 of the present invention also generates an intermediate voltage inside of the power regulation circuit, however the intermediate voltage can be but does not need to be used directly. Instead the intermediate voltage is fed back into the AC part to then indirectly control (and regulate) the output voltage. This intermediate voltage that indirectly controls the output voltage across the load 10 could be generated using the output voltage itself (however there would be additional losses and components required to do this). Alternatively in a phase controlled rectifier system the intermediate voltage would be the output voltage itself which is quite limiting. The independent control voltage is generated from the same AC source that it feeds back into. This independent control voltage can build at as a natural consequence of the correct phase or timing being applied to the switching of the power control switches. The half bridge that is used to do the switching, comprising the power control switches 20,21, can be replaced with something else to achieve a similar overall function.

In one embodiment the control system may be a current-locked loop, not a phase-locked loop. That is, a feedback signal such as a phase reference signal is the peak current in the receiving coil 13. This is the same as peak current into the combination of the DC smoothing capacitor 15 and the load 10. This peak current into the DC smoothing capacitor 15 is related to average current to the load 10. The value of the peak current in the receiving coil 13 as a roughly linear relationship with the average current into the load 10.

Figure 6:
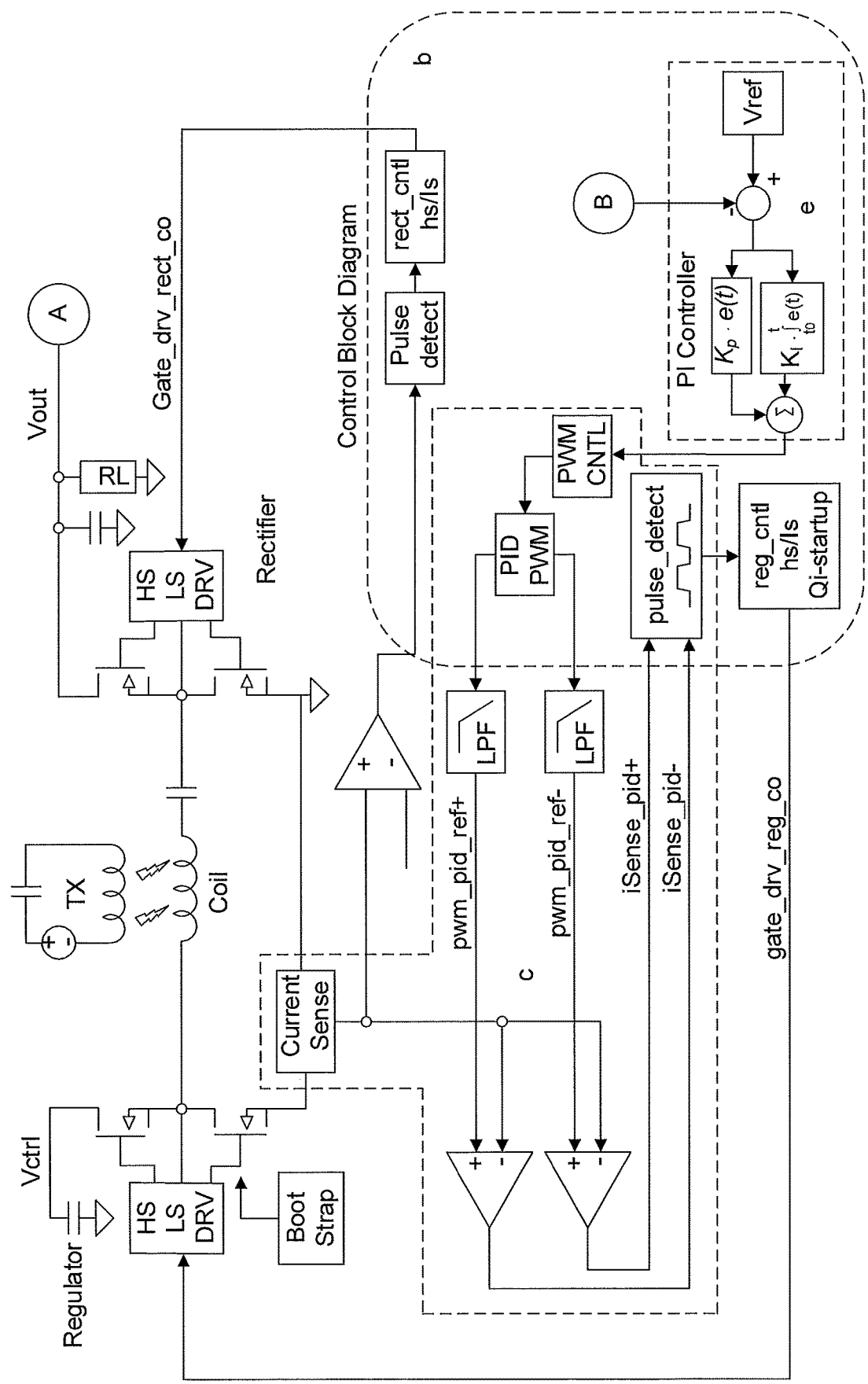
FIG. 6 is a schematic of an example control configuration for the power receiver.
Figure 6:
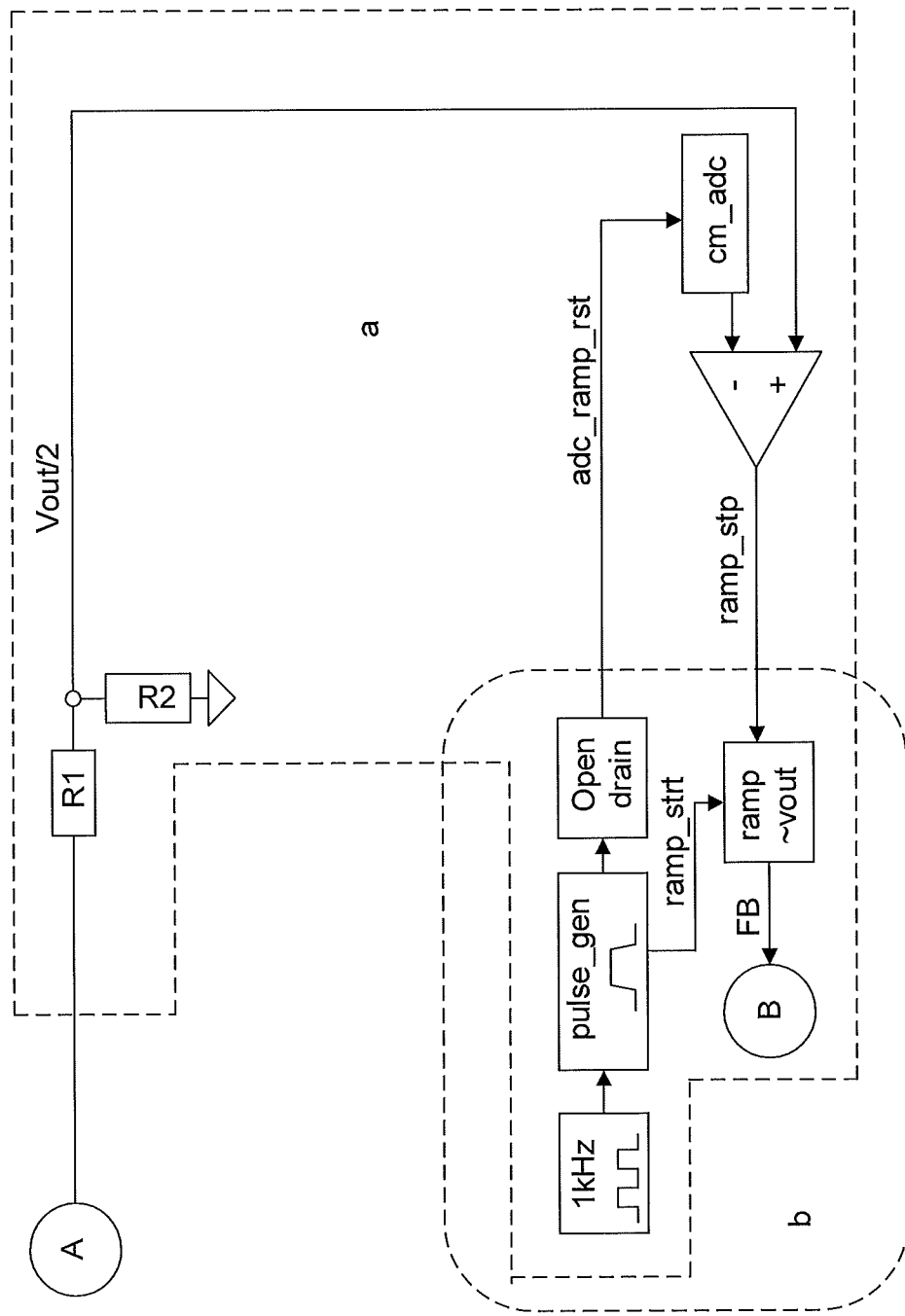
Figure 7:
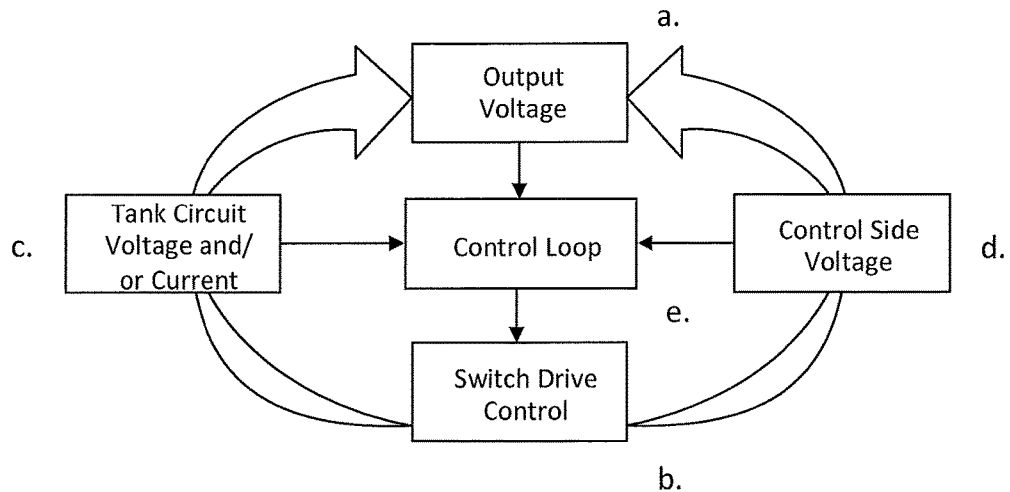
FIG. 7 is a schematic diagram of the control configuration applicable to the power receiver of FIG. 6.
Figure 8:
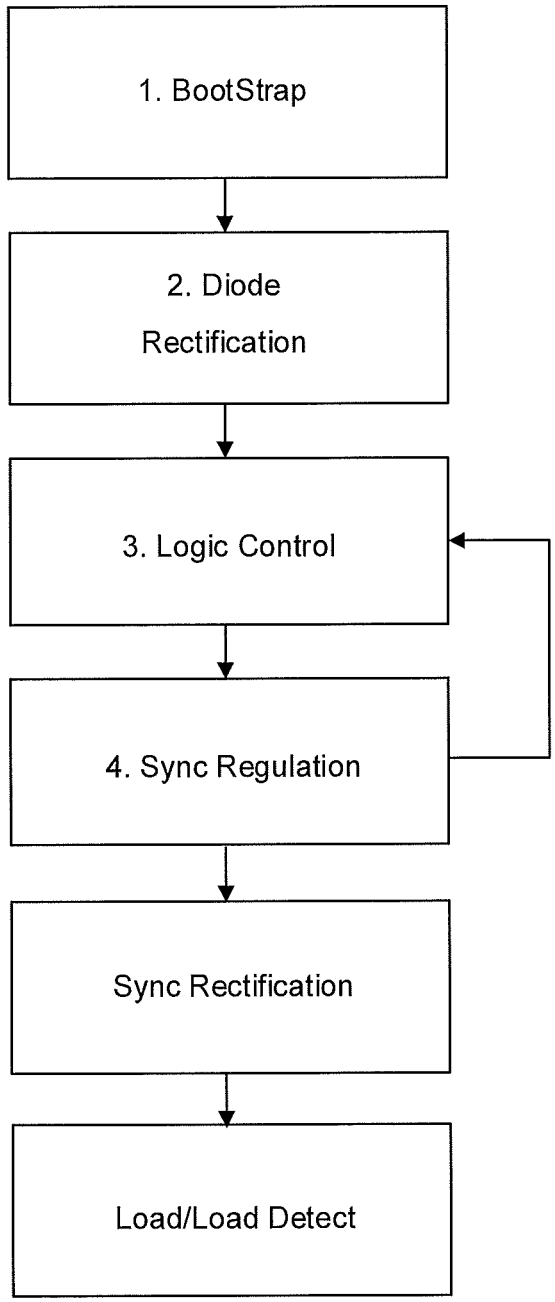
FIG. 8 is a flow diagram of a start-up sequence of the control configuration of FIG. 6.
Figure 9:
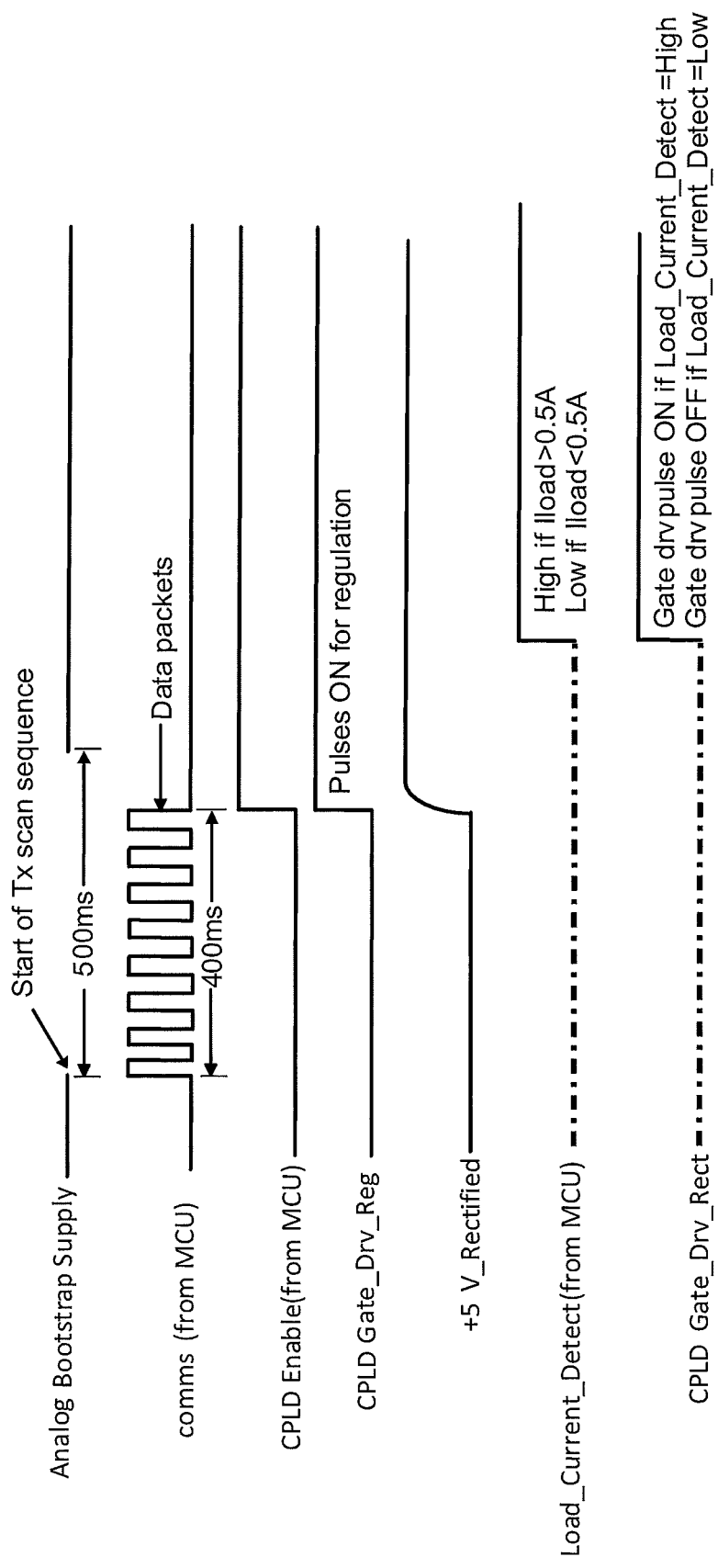
FIG. 9 is the timing diagram of the control flow of FIG. 7.

FIG. 6 illustrates an example control configuration for the power receiver 3, FIG. 7 shows a control flow of this control configuration, FIG. 8 shows a start-up sequence of a similar control configuration, and FIG. 9 is the timing diagram for this start-up sequence. In these drawings:

Step 1 Bootstrap—Circuit to start the regulation via diode rectification. This is the start-up process for the wireless RX circuit.

Step 2 Diode rectification—This is the diode rectification phase that supplies initial power and powers the logic control sub-system and gate drivers.

Step 3 Logic Control—Once the diode rectification starts, power is supplied to the logic control. The load current is measured and for low loads regulates but stays in diode rectification. Once the load reaches a certain value, the logic control starts synchronous rectification.

Step 4 Synchronous Regulation Control—with reference to FIGS. 6 and 7, the switching time (b.) is controlled via a feedback control loop (e.) based on the measured output voltage (a.), tank energy (c.) and or control side voltage (d.).

One possible control method based on this example is as follows:

1. Start-up sequence:
a. Bootstrap circuit used to supply power via diode rectification;
b. Once a minimum voltage has been reached on the logic control sub-system the normal regulation can start.
2. Normal regulator operation:
a. Use output voltage to generate a reference current for switch timings:
i. Measure output voltage;
ii. Feed value into controller (e.g. PID feedback loop);
iii. Controller generates a reference current;
b. Control the regulator switch timing based on the generated reference current:
i. Continuously compare (instantaneous) coil current to reference current;
ii. invert the output from the control FETs when either:
1. coil current exceeds reference; or
2. predefined timeout is reached;
iii. Continuously compare (instantaneous) coil current to negated reference current;
iv. invert the output from the control FETs when either:
1. coil current drops below negated reference; or
2. predefined timeout is reached; and
v. Repeat (return to 3.a.).

Practically parts of this control method are implemented in continuous analogue circuitry, so very high frequency sampling is not necessary and accurate timing can be achieved.

Regulation control does not have to be based on instantaneous current, it could also be based on variables from the tuned circuit, i.e., the energy in the resonant circuit.

Further, in FIG. 6:

Clk=40 MHz

Fs=120 kHz

ADC_rstlread_start every 1 KHz pulse high (width determined by time constant RC on current mirror.

adc_rst pulse high restarts adc. adc-rst stays high until rc time constant on current mirror is 5+tau.

adc_rst goes ow and starts counter while current mirror adc ramps voltage. Once ~Vout/2 (?) stop pulse generated and proportionate voltage generated to PI control.

Use countx2 value as input to P1 controller

Vref-Vmeasured=error:
if error going up adjust Iref+ pwm duty cycle down.
if error going down adjust Iref+ pwm duty cycle up.
Iref+,- duty cycles inverted.

Losses in the receiver may not significantly change as the receiver coil voltage ($V_{OC}$) changes, this is because the currents end up being similar regardless of receiver coil voltage. It is possible to output anywhere between zero power and full power in any AC (IPT) magnetic field, with very low losses under all conditions (similar to a sync-rectifier, sync-buck configuration). Because the output voltage is indirectly controlled without additional regulators (e.g., switch-mode converter/LDO) in an elegant and efficient way, it may be relatively low cost and low loss. Further, implementation may only require additional capacitors, there is no need for any additional inductors (the only inductor is the pickup coil itself). The switching element(s) only need to deal with voltages from 0V up to a voltage proportional with $V_{OC}$ of the inductor in the magnetic field (very high resonant voltages need not be seen at any of the switches, even when operating at high Q). For example, with a magnetic field constrained to a fairly reasonable range, the present receiver can be operated with 5V output, with a wide range of loads, while keeping all voltages below 20V, as may be desired for ASIC implementation.

Current flow is mostly continuous (there are conditions at lower loading/lower currents where it may not be), which means an output current can be achieved with reasonably low currents, so does not have very short, high pulse currents. A minimal number of high power components (FETs/switches) are used and the control circuitry can be implemented into an ASIC. For example, the half-bridge implementation requires only 4 switches, or even just 2 switches and 2 diodes, and a full-bridge implementation may require 6 switches, or 2 switches and 4 diodes. Further still, the implementation can be achieved using very few IC pins. For example, the half-bridge implementation potentially needs only 4 pins, and two capacitors in addition to LC tank.

An embodiment may be non-resonant (i.e., will work equally well at any frequency) and still achieve almost the same peak power transfer as a resonant system. Also, since IPT systems generate an AC signal (field) then rectify it back to DC they are actually quite similar to other DC-DC converters, so an embodiment may also be used to create a DC-DC converter (with no wireless power transfer component).

Specific components/modules can be connected in many different but functionally equivalent/similar ways (e.g., balanced/unbalanced capacitors, configured as a split full bridge with LC tank in the middle/two half bridges connected directly together then LC tank afterwards). Embodiments can be implemented using any combination of half-bridge rectifiers, full-bridge rectifiers, synchronous/non-synchronous rectifiers and essentially any form of rectifier that converts AC to DC. The inverter would ideally be any form of inverter (DC to AC) that can also act as a rectifier (AC to DC) when operated in reverse. Alternatively, any rectifier could be combined with any form of inverter to achieve the same effect as the inverter/rectifier, i.e., invert one way, rectify the other way. The functionality can be improved by using switches for the rectifier part too (e.g., sync-rectifier), and then controlling these switches in a way that is not the same as a rectifier to intentionally feed energy into the control side (in order to prevent energy unintentionally increasing the output voltage).

Also by using switching components for all parts including the rectifier, it is possible to boosts the output voltage higher than what the coil would normally generate. It is possible to do a lot more if switches are used instead of diodes for the rectifier (and this may actually be necessary to make the system operate and regulate as intended under all conditions). If switching devices are used instead of (or in conjunction with) diodes in the "rectifier" stage, then lower loss synchronous-rectification can be achieved. In synchronous-rectification the switching devices are controlled by the controller such that they conduct at the same time as the diodes would normally conduct. However it is also possible to control the timing of these switching devices in many other ways with different effect.

In particular, it is advantageous to dynamically advance or retard the timing of the switching devices so that the "rectifier" stage is no longer always a simple rectifier, but rather a phase controlled inverter/rectifier. In this case, the timing for operating all switching devices of the rectifier is advanced/retarded (all together by substantially the same amount) from the normal synchronous-rectifier timing in order to control the amount of power that flows to the output of the rectifier.

With this approach of dynamically controlling the conduction timing, assuming sinusoidal AC currents at input to the rectifier:

- maximum transfer of power from rectifier input to output occurs when switching devices operate as a synchronous-rectifier;
- maximum transfer of power from rectifier output to input occurs when switching devices are advanced/retarded by 180 degrees, with respect to synchronous-rectifier timing based on the rectifier input current. (i.e., inverted synchronous-rectifier);
- zero transfer of power from rectifier input to output (and vice versa) occurs when switching devices are advanced/retarded by 90 degrees, with respect to synchronous-rectifier timing based on the rectifier input current;
- other advance/retard phase-angles will result in varying levels of power transfer from input to output between zero and maximum power.

In conventional operation of a rectifier (or synchronous rectifier) for an IPT receiver, the average output power is directly related to the average pick-up coil current. However, the above-described phase-control approach allows the output power to be controlled independently of the current in the pick-up coil, which is especially useful in providing effective power flow control under extreme loading and/or coupling conditions.

Further, a single untapped coil can be used (and this is beneficial), however a centre-tapped coil or any other form of magnetically coupled coil(s) could be used. There may be other advantages associated with this approach (i.e., could be made to work at voltages lower than $V_{OC}$ of the primary pickup coil).

Figure 10A:
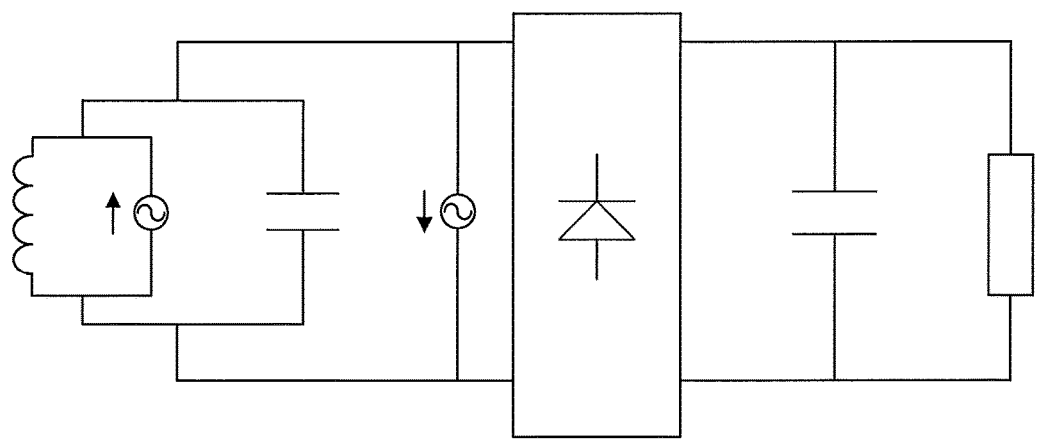
FIG. 10($a$)-($b$) are simplified diagrams of receivers which create a current source in order to control power flow.
Figure 10B:
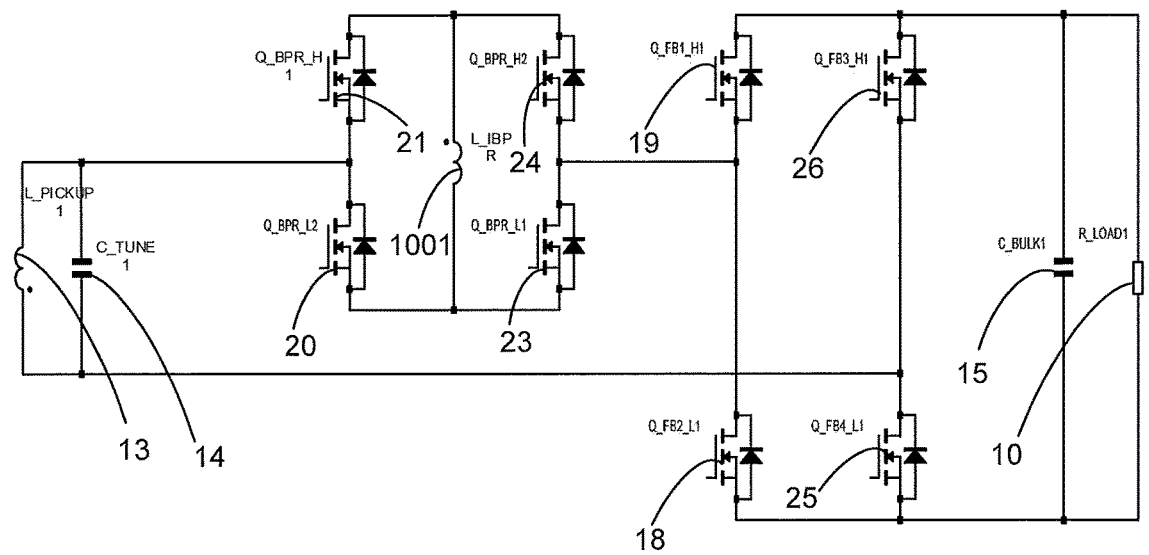

The receiver is configured to operate with voltages in a series tuned configuration. However currents in a parallel tuned system can also be used, such as illustrated in FIG. 10a. In this case, a current source is generated in parallel with a parallel tuned receiving coil 13. A further variation is shown in FIG. 10b. In this example, the controllable current source is connected in series with a parallel tuned receiving coil 13. The current source comprises a large DC inductor 1001 and a modified H-bridge circuit. The polarities and connections of the H-bridge switches should be noted as they are different to a standard H-bridge circuit. By correctly switching the H-bridge, the current flowing through the large DC inductor 1001 can be made to flow into the power receiving circuitry 8, out of the power receiving circuitry 8 or can be made to free-wheel and thereby bypass the power receiving circuitry 8. By timing the phase of the switches in the modified H-bridge circuit with respect to the rest of the inductive power receiver 3, the output voltage and/or the current flowing in the DC inductor 1001 can be controlled.

Figure 11:
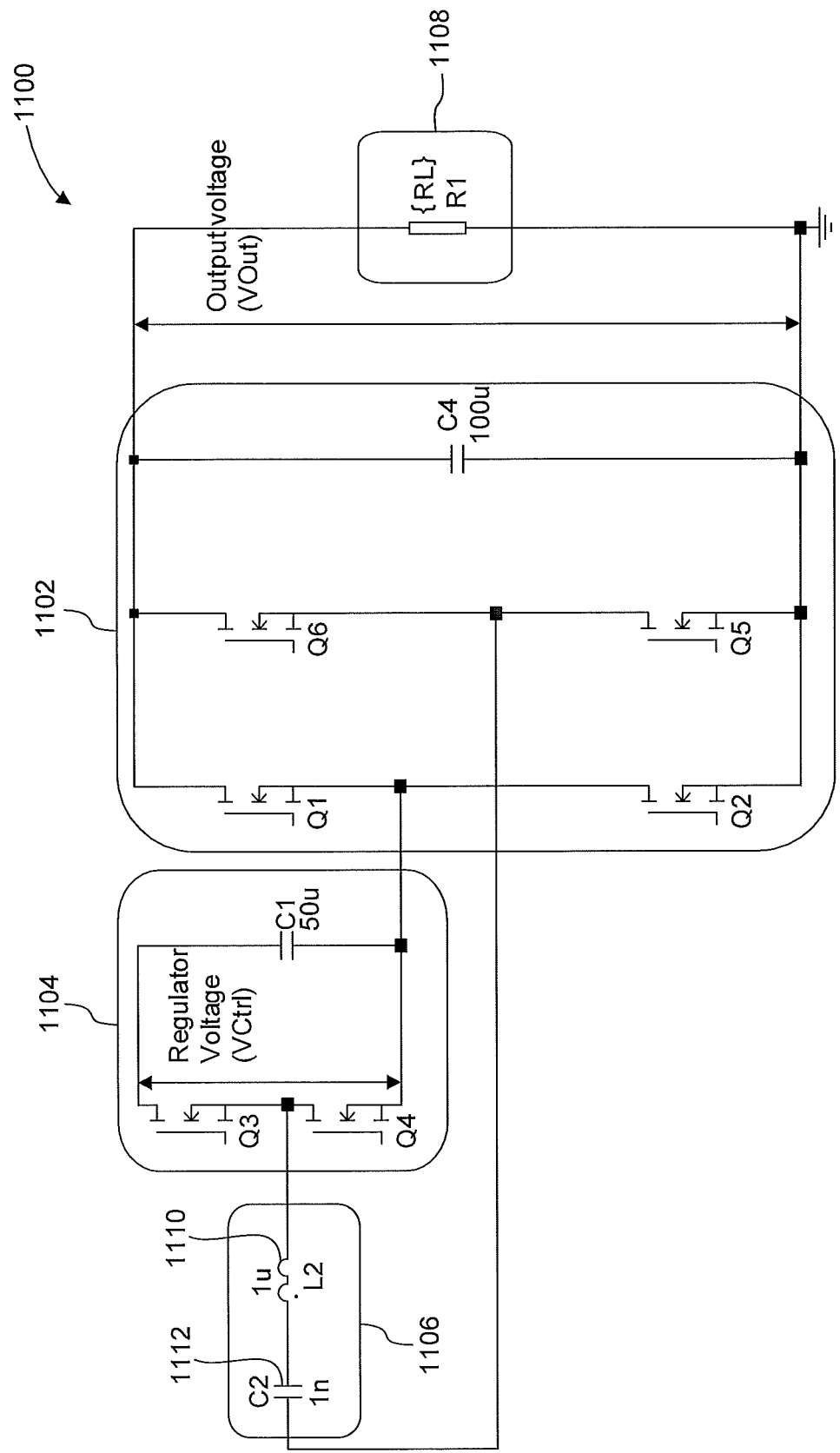
FIG. 11 is a circuit diagram of an inductive power receiver according to another embodiment

FIG. 11 is an alternative circuit 1100 for the power receiver. In this case the half bridge configuration of the rectifier described above is replaced with a full bridge rectifier/inverter 1102 with a regulator 1104 that is floating having its output connected to one input of the rectifier (i.e., a point between first and second switches Q1 and Q2 of the rectifier), a series tuned pickup 1106 connected to the input of the regulator and the other rectifier input (i.e., a point between third and further switches Q3 and Q4 of the rectifier) and a load 1108 connected to the rectifier output and grounded.

The regulator 1104 is a half bridge inverter which is controlled to provide a voltage in series with the series tuned pickup 1106 as described previously. The regulator may alternatively be implemented using different circuits to provide the controllable series voltage according to the application requirements.

Employing a full bridge rectifier provides increased coupling efficiency between the receiver and the transmitter of the IPT system. However, the Applicant has found that the full bridge configuration requires specific control strategies to ensure effective and reliable operation of the AC side power flow regulation provided by the present invention. These control strategies are also applicable to the half bridge implementation. The full bridge rectifier may be driven synchronously further improving efficiency.

Figure 12:
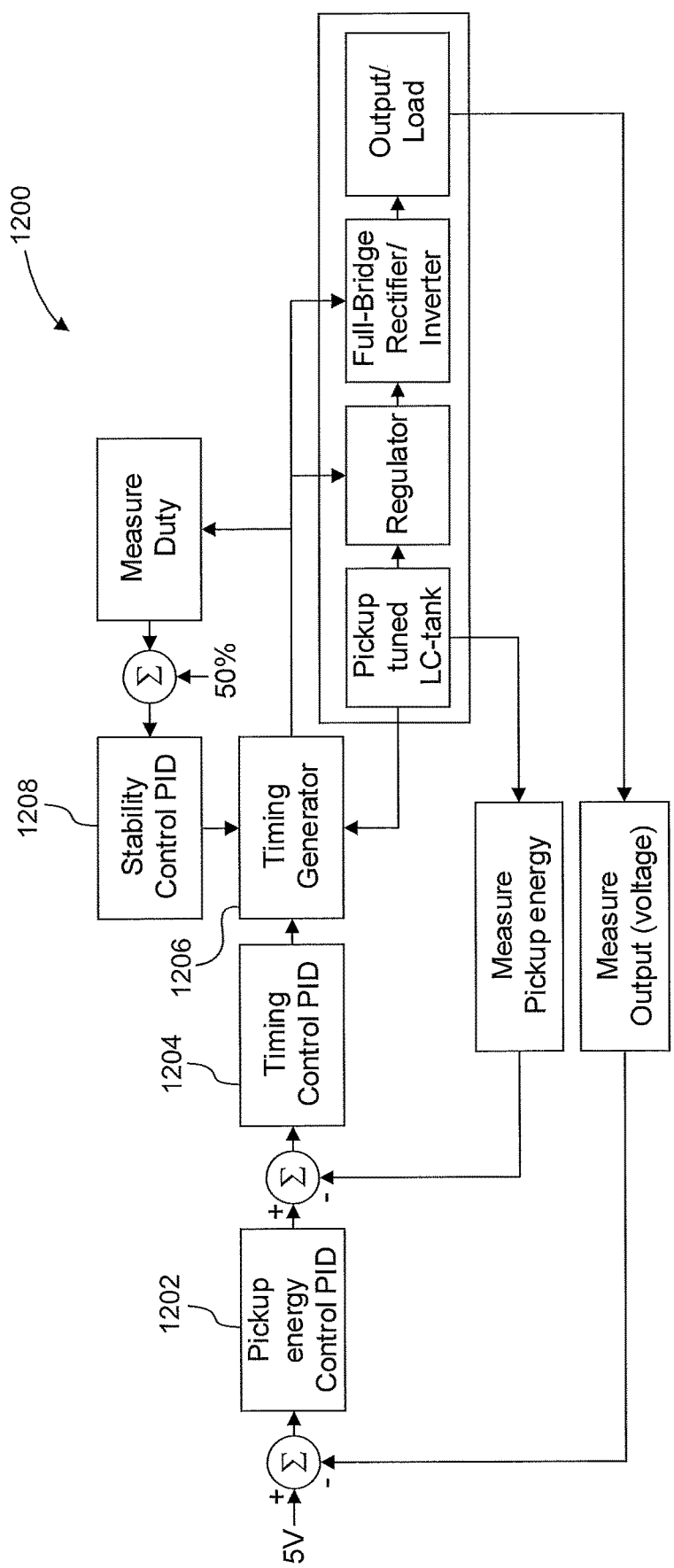
FIG. 12 is a schematic diagram of a control configuration.

FIG. 12 shows a control strategy 1200 for the regulator 1104 and the rectifier/inverter 1102 in FIG. 11. A proportional-integral-derivative (PID) controller 1202 for the pickup energy takes the voltage error from the output voltage to the load 1108 (compared to a target voltage, e.g., about 5 VDC) and generates a target for the pickup energy (target for current of an inductor 1110 of the pickup circuit; series tuned resonant circuit of the inductor 1110 and a capacitor 1112). A timing PID controller 1204 takes the pickup energy error (coil current error) from the PID controller 1202 and generates timing adjustments for the regulator 1104 switches. For example, if the pickup energy is less than the target, the regulator 1104 voltage is decreased by advancing/retarding the gate drive timing, and vice versa.

It is possible to control the timing for the regulator 1104 switches directly from the PID controller 1202, i.e., bypass timing PID controller 1204, however the extra stage of the timing PID controller 1204 allows the currents in the pickup to be controlled to help prevent instability (e.g., when current changes too quickly or drops too low). The timing PID controller can also be used to control the rectifier 1102 gate drive timings.

Figure 13A:
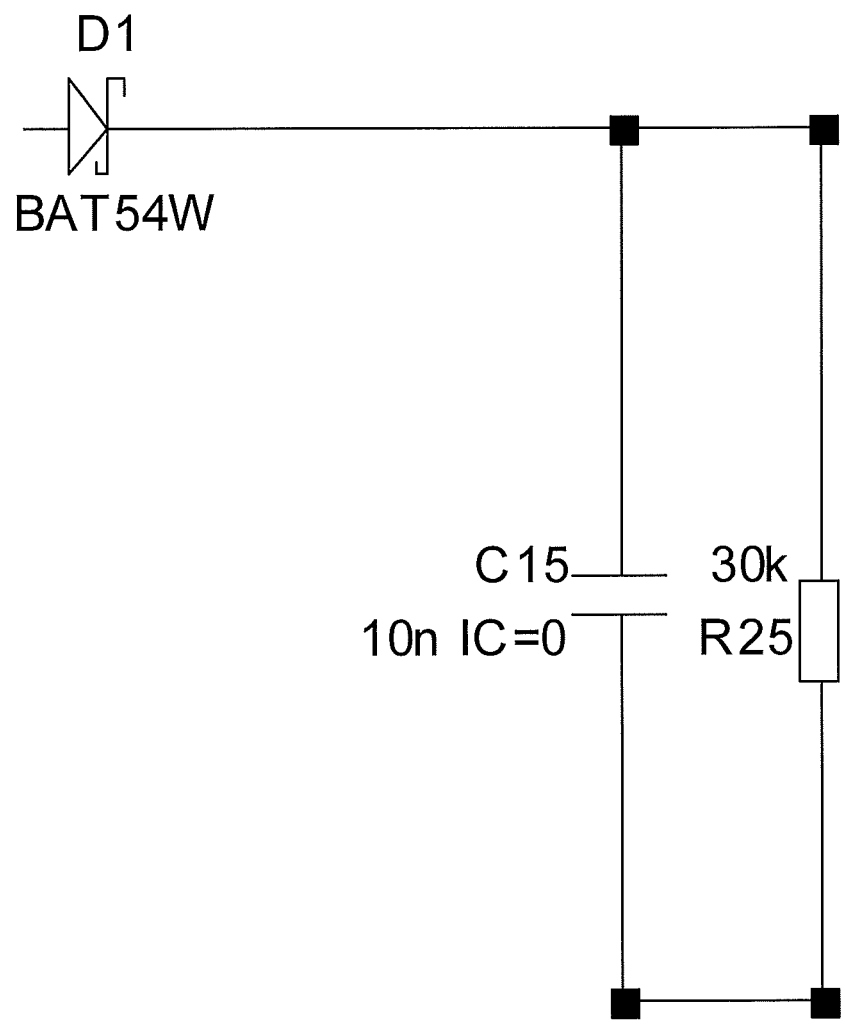
FIG. 13($a$)-($b$) are a circuit diagram of a diode peak detector circuit and a capacitor voltage waveform, respectively.
Figure 13B:
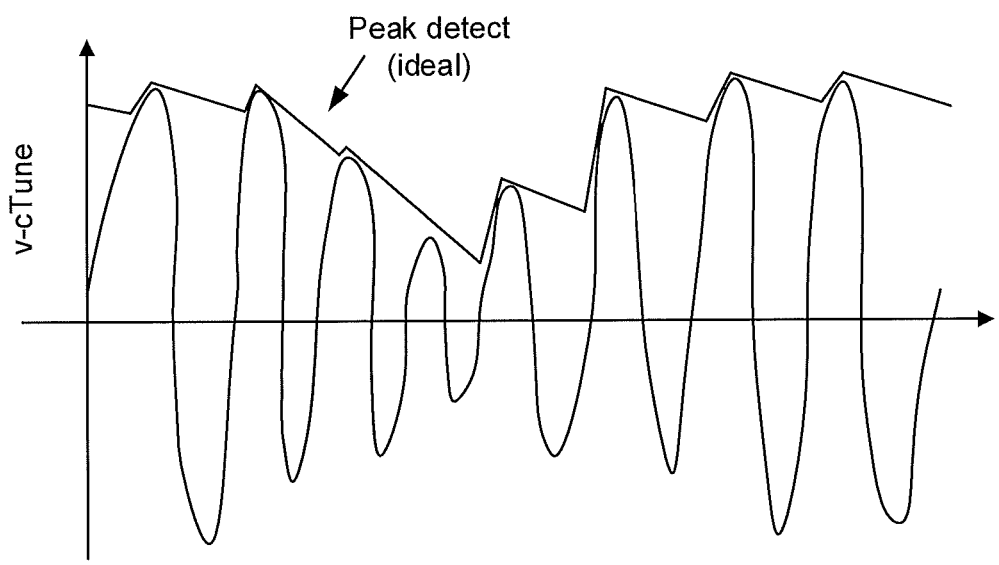

The pickup energy can be calculated according to Equation 1:

$$E = \tfrac{1}{2} L_{pu} I_{pk}^2 = \tfrac{1}{2} C_{tune} V_{pk}^2 \qquad (1),$$

Where $L_{pu}$ is the inductance of the pickup coil 1110 and $C_{tune}$ is the capacitance of the tuning capacitor 1112. In other words the coil current can be determined by the capacitor voltage. A diode peak detector circuit can be used to measure the capacitor voltage, or alternatively a fast sampling ADC could be used to measure peak voltage each cycle. An example peak detector circuit is shown in FIG. 13(a) and FIG. 13(b) illustrates an exemplary capacitor voltage waveform.

A timing generator 1206 generates timing for the gate drive of the regulator switches based on voltages/currents in the series tuned pickup 1106. Ideally the timing is based on generating and applying threshold voltages to the voltage across the tuning capacitor 1112, but another option is the coil current.

Figure 14A:
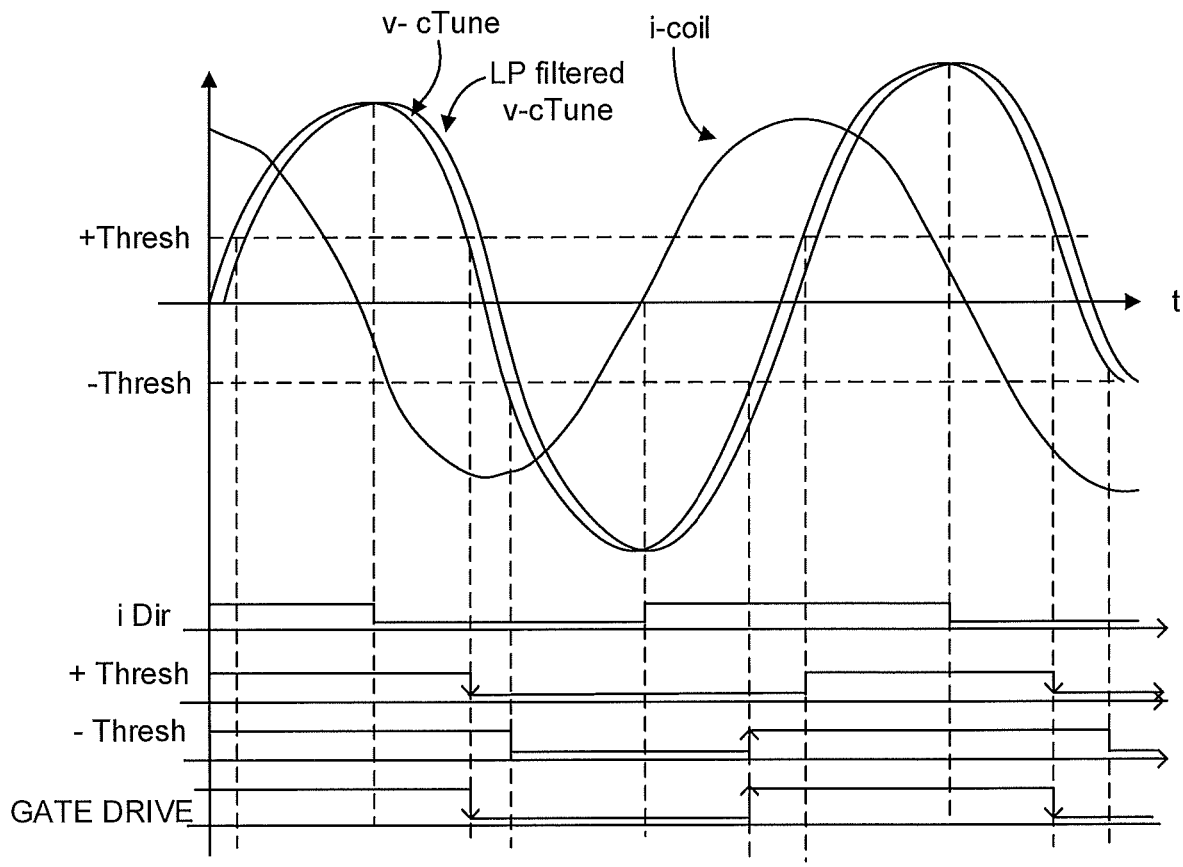
FIG. 14($a$)-($c$) are timing diagrams for the regulator switch timings.

FIG. 14(a) shows the positive and negative thresholds generated by the timing generator 1206 being compared to the tuning capacitor voltage. +Thresh is a signal representing whenever the capacitor voltage is above a positive threshold value and −Thresh is a single representing whenever the capacitor voltage is above a negative threshold value. The falling edge of +Thresh and the rising edge of −Thresh are used to generate the gate drive signal.

Figure 14B:
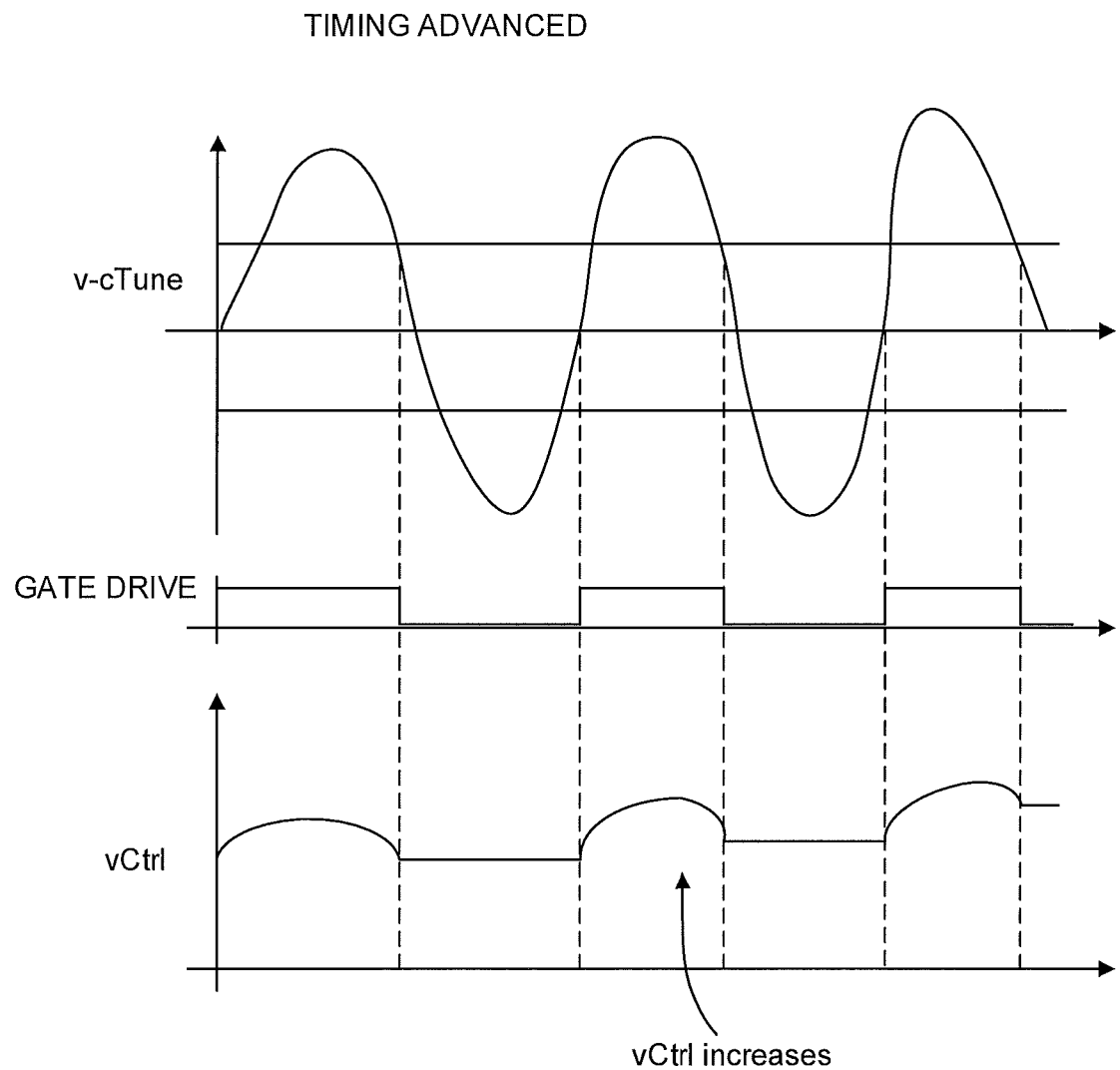
Figure 14C:
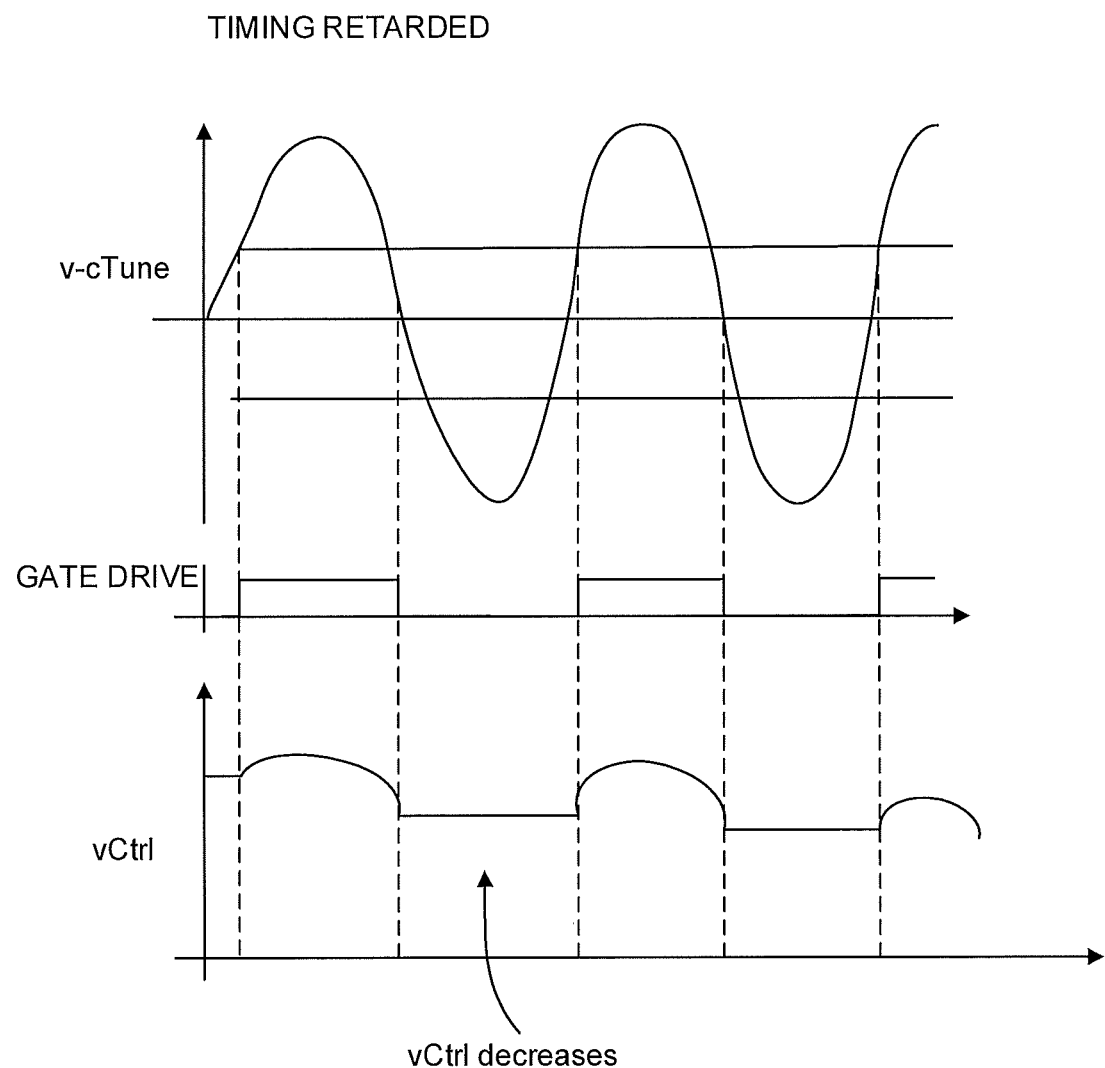

The relative values of the positive and negative thresholds affect whether the timing is advanced or retarded. FIG. 14(b) shows that advancing the timing increases the regulator voltage (vCtrl), and FIG. 14(c) shows that retarding the timing decreases vCtrl. Alternatively, the circuit 1100 can be configured so that advancing decreases VCtrl and vice versa.

Figure 15A:
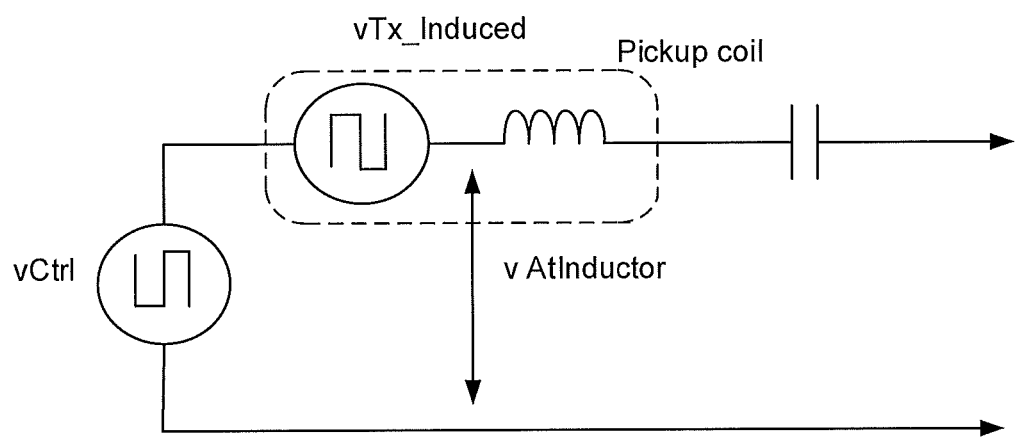
FIG. 15($a$)-($b$) are a simplified circuit and the voltage graphs related to it, respectively.
Figure 15B:
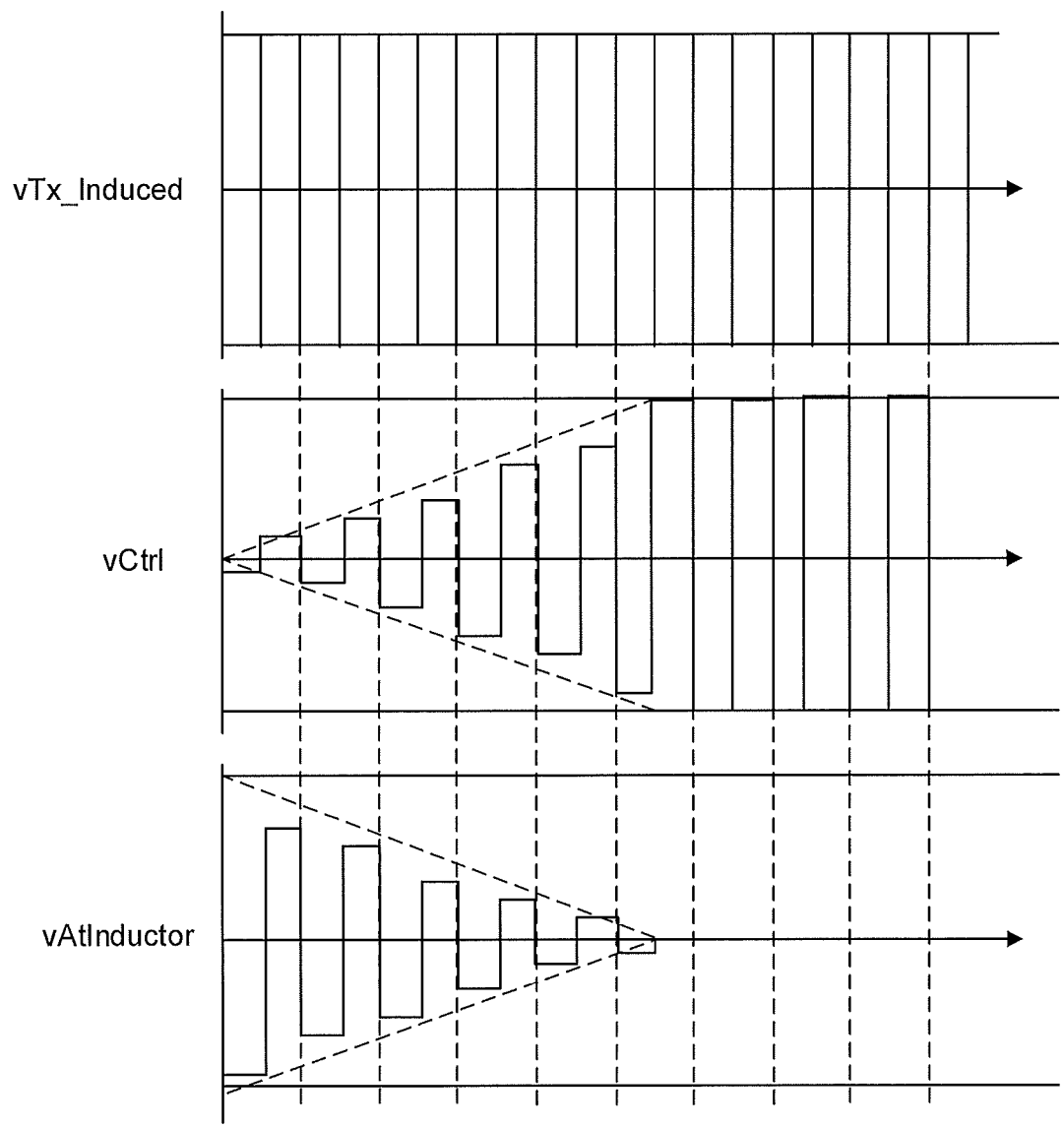

FIGS. 15(a) and 15(b) show how the regulator 1104 voltage affects the coil current. In this idealistic example the regulator 1104 voltage in FIG. 15(b) is in phase with the pickup stage induced voltage, so that the magnitudes effectively sum. While the voltages in FIG. 15(b) are shown as square waves, it may work effectively with sinusoidal induced voltages as well.

A Stability Control PID controller 1208 controls the threshold of the timing generator 1206. If the duty cycle is above 50% the timing generator thresholds are increased to reduce the duty cycle, and vice versa. The control system for implementing the disclosed control strategies could also be implemented using a complex programmable logic control device (CPLD).

Figure 16:
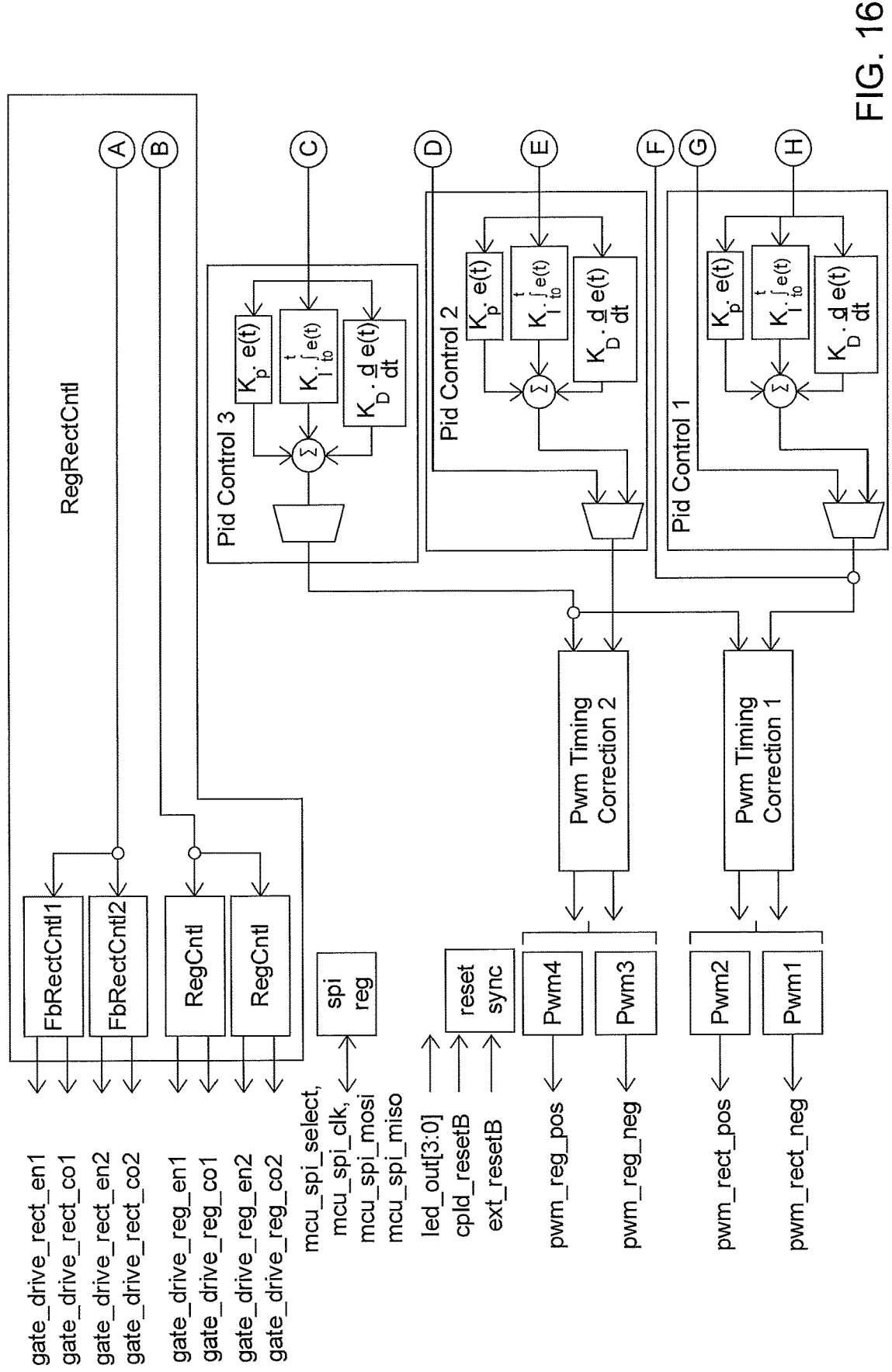
FIG. 16 is a schematic of an alternative feedback control configuration for the power receiver.
Figure 16:
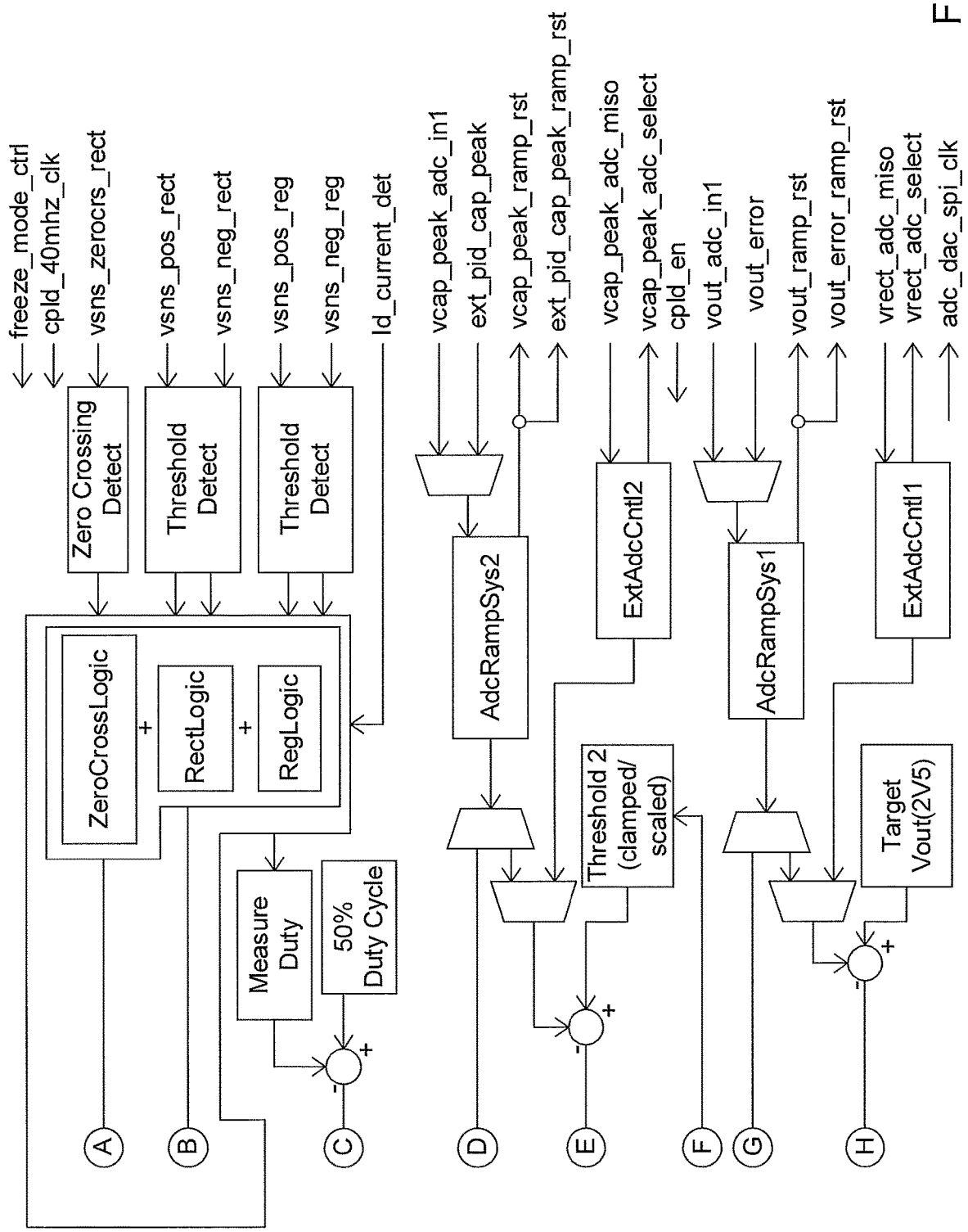

FIG. 16 shows a more detailed implementation of the feedback controller which determines the PWM gate signals for the regulator 1104 and the rectifier 1102. PidControl1 is an example implementation of the pickup energy control PID 1202. PidControl2 is an example implementation of the timing control PID 1204. PidControl3 is an example implementation of the stability control PID 1208. RecRectCntrl implements the algorithm stored in the RectLogic and ZeroCrossLogic respectively. This may include synchronous switching of the rectifier and/or Zero Voltage Switching (ZVS) of the rectifier.

Referring again to FIG. 2a, the phase relationship between the voltage created by the power regulation circuit 11 and the voltage or current in other parts of the inductive power receiver 3 can be controlled in order to regulate the output power to the load 10. Alternately, if the power regulation circuit 11 is configured to be a current source, the phase of the current created by the power regulation circuit 11 can be controlled relative to the rest of the inductive power receiver 3 in order to regulate the output power to the load 10.

When the phase relationship between the power regulation circuit 11 and the rest of the inductive power receiver 3 is controlled in order to regulate the output power to the load 10, the high rail DC bus voltage or other voltages and currents within the power regulation circuit 11 may be free to vary to arbitrary values as a result of the specific system parameters at the time, such as the value of $V_{OC}$, the current drawn by the load 10 and the phase set by the controller 16 between the power regulation circuit 11 and the rest of the inductive power receiver 3. Alternately, both the high rail DC bus voltage and the relative phase of the power regulation circuit 11 may be simultaneously controlled. For example, the high rail DC bus voltage may be held at a particular value using an additional DC-DC converter or may be connected directly, via a diode or via some other circuit to the output voltage which appears across the load 10. This may however add additional complexity and inefficiency.

Figure 17:
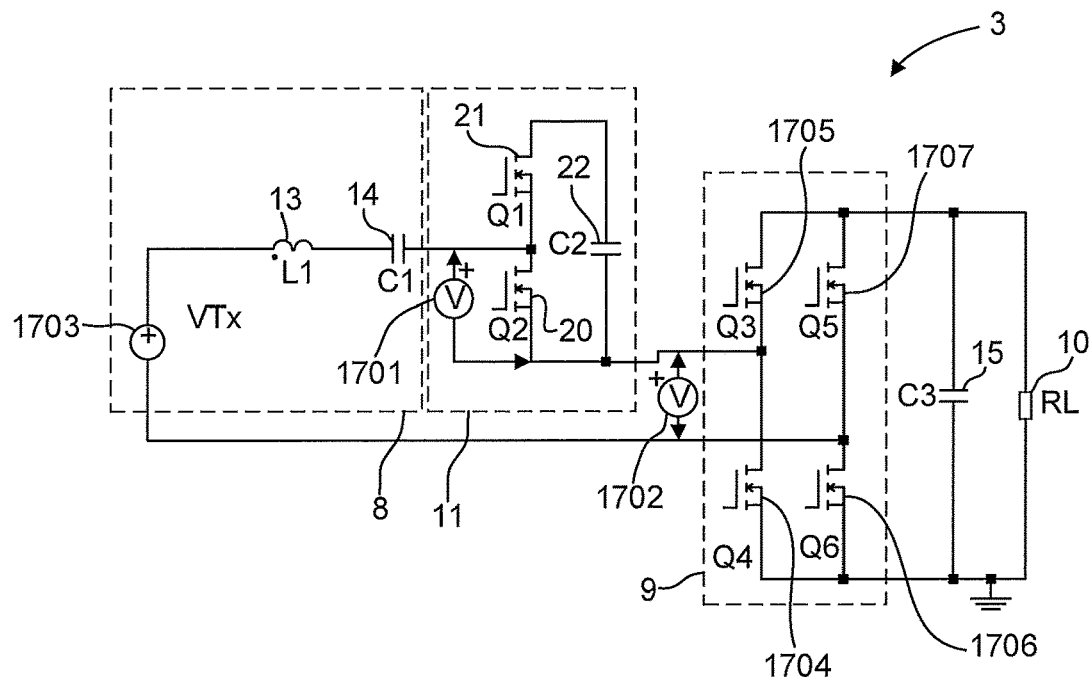
FIG. 17 is a schematic of a receiver which creates a phase controlled voltage source to control power flow.

An inductive power receiver 3 capable of creating a phase controlled voltage to control the output voltage at the load 10 is shown in FIG. 17. The created voltage 1701 is shown as an output of the power regulation circuit 11. In this example the rectifier input voltage 1702 is used as a phase reference for switching the power regulation circuit 11. The rectifier input voltage 1702 appears across the input to the power conditioning circuitry 9. In this example, the voltage $V_{OC}$ 1703 induced across the receiving coil 13 from the inductive power transmitter 2 is modelled in this example as a voltage source in series with the receiving coil 13. The power conditioning circuitry 9 comprises four asymmetric flow devices 1704, 1705, 1706, 1707 which are NMOS field effect transistors configured for synchronous rectification and arranged in a full bridge configuration.

Figure 18B:
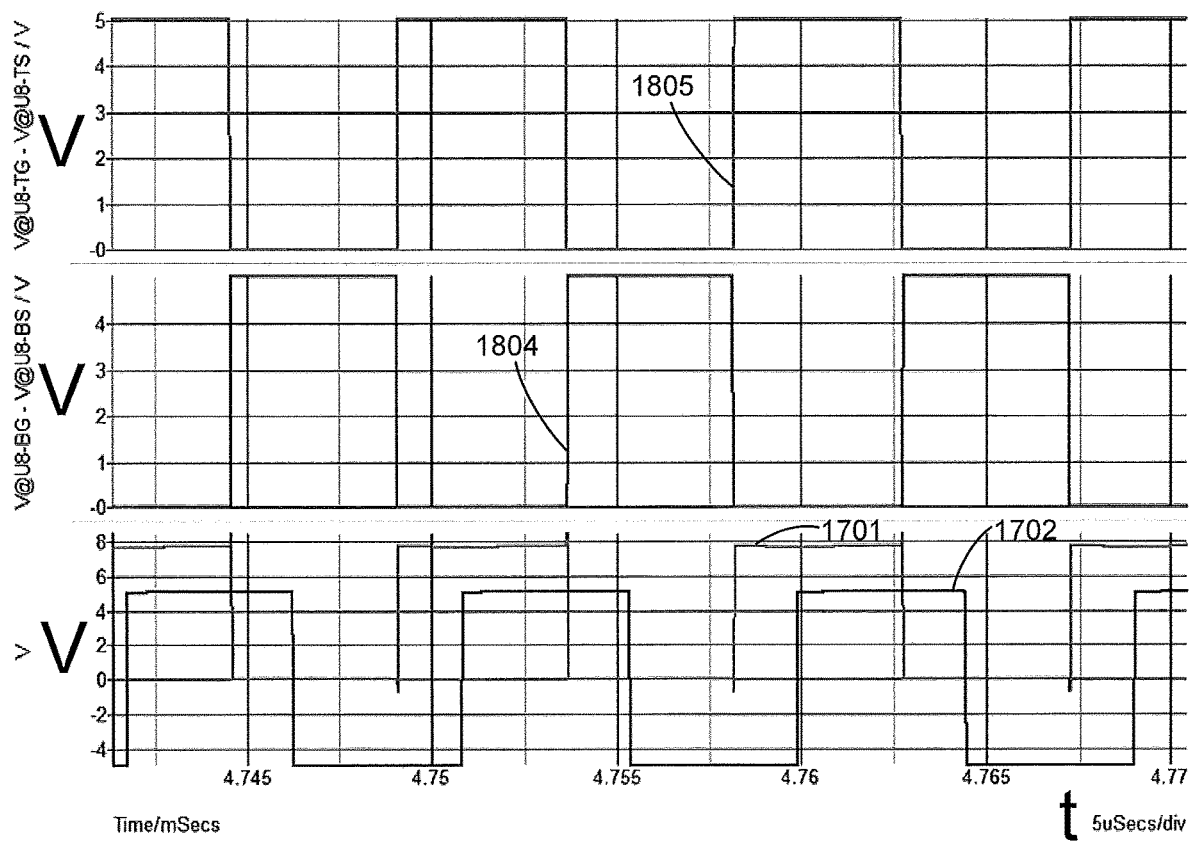
FIG. 18($a$)-($b$) are a set of waveforms corresponding to the receiver of FIG. 17.
Figure 18A:
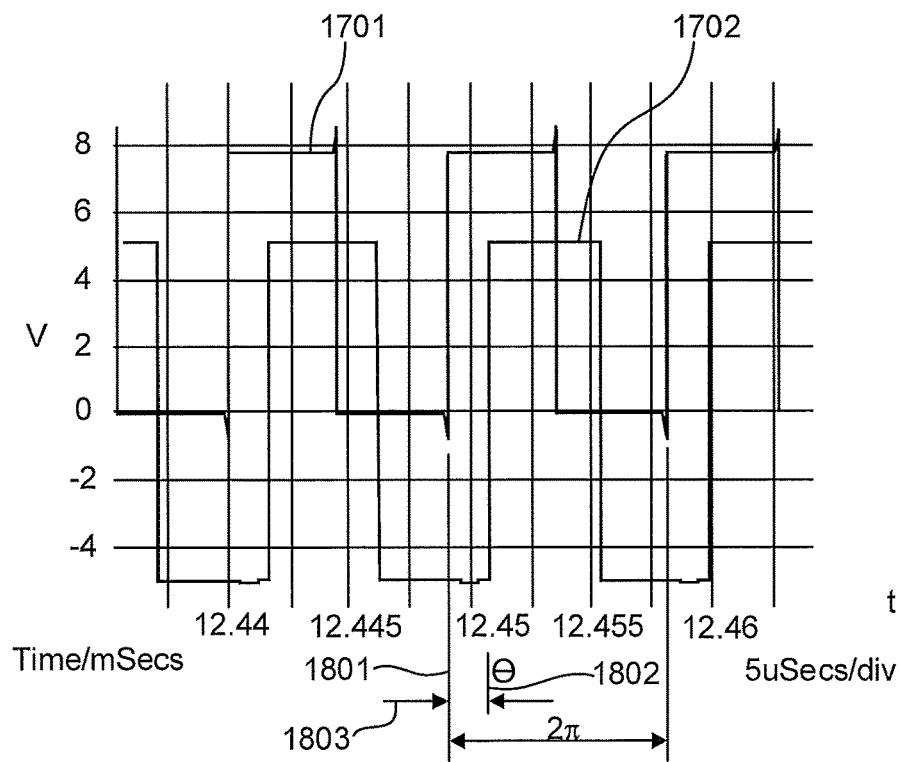

A set of voltage waveforms are shown in FIG. 18a for the inductive power receiver 3 of FIG. 17. Traces for the created voltage 1701 and the rectifier input voltage 1702 are shown, with the latter being used as a phase reference for the controlling the former. Although the average of the created voltage 1701 is positive, the resonance capacitor 14 can also block DC voltage and so the net effect of the created voltage 1701 and the resonance capacitor 14 in series is an average voltage of zero volts. The rising edge of the created voltage 1801 and the rising edge of the rectifier input voltage 1802 are also shown. The phase delay angle θ 1803 is controlled by the controller 16. While the phase delay angle θ 1803 might be more accurately referred to as a "phase advance angle" due to the way it is drawn, the term phase delay angle θ 1803 will be used herein. FIG. 18b further includes a first gate drive voltage $V_{GS}$ 1804 of the first power control switch 20 and a second gate drive voltage $V_{GS}$ 1805 of the second power control switch 21.

Since the rising edge of the rectifier input voltage 1802 is the phase reference signal and it occurs after the rising edge of the created voltage 1801, the former cannot be used directly to trigger the latter. Instead, because the controller 16 knows or can measure the operating frequency of the inductive power transmitter 2, the moment that any given rising edge of the rectifier input voltage 1802 can be predicted by adding a time delay of $2\pi$ radians to the point in time that the previous edge occurred. Alternately, a falling edge of the rectifier input voltage 1702 can be used to trigger a rising edge of the created voltage 1701, or a rising edge can be used to trigger a falling edge.

Figure 19:
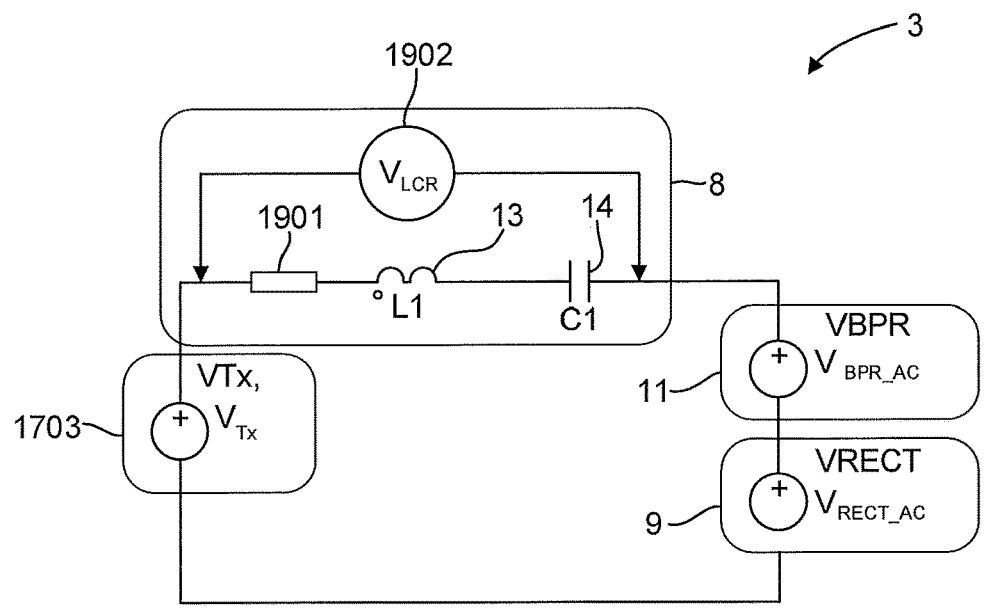
FIG. 19 is a simplified receiver block diagram.

FIG. 19 shows a simplified circuit of an inductive power receiver 3 which regulates the input voltage to the power conditioning circuitry 9 by creating a voltage in series using a power regulation circuit 11. Also shown connected in series is $V_{OC}$ 1703 and the power receiving circuitry 8. The power receiving circuitry 8 in this example comprises a series connected receiving coil 13 and resonance capacitor 14 as well as an equivalent series resistance 1901, though other configurations are also possible. The voltage which appears across the power receiving circuitry 8 is $V_{LCR}$ 1902. This voltage is due to the current flowing through the equivalent series resistance 1901 as well as any harmonic voltages and any reactive voltages which might arise due to mis-tuning of the power receiving circuitry 8. The voltage may also be a result of using square waves and not sine waves in the IPT system 1.

Figure 20:
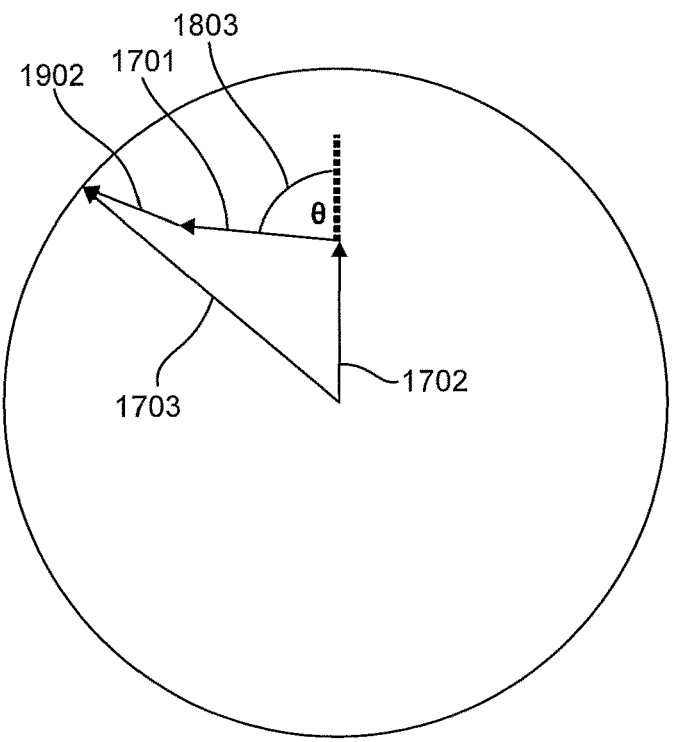
FIG. 20 is a phasor diagram for a receiver.

A phasor diagram is shown in FIG. 20 for when the inductive power receiver 3 is controlled using a phase offset between the rectifier input voltage 1702 and the created voltage 1701, though the diagram is also applicable to other phase reference sources and voltage or current sources. In this diagram, only the fundamental frequency component, for example 110 kHz, is shown. The vector sum of the rectifier input voltage 1702, the created voltage 1701 and $V_{LCR}$ 1902 add up to equal $V_{OC}$ 1703, because the sum of all voltages in a loop must equal zero. In the case of a fixed magnetic coupling between the transmitting coils(s) 6 and the receiving coil 13 and a fixed output voltage across the transmitting coil(s) 6, $V_{OC}$ 1703 will remain approximately constant.

Figure 21:
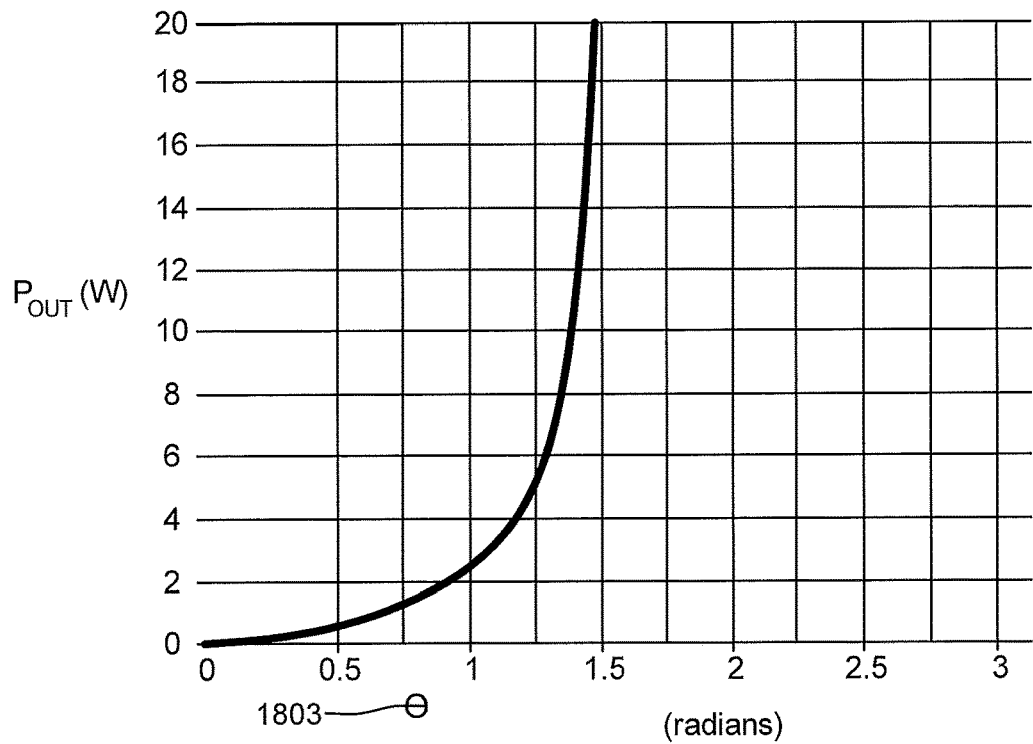
FIG. 21 is a graph showing a relationship between a phase delay angle and output power.

A graph showing the relationship between the output power and the phase delay angle θ 1803 is shown in FIG. 21. This graph assumes that resistance of the load 10 is changed while the output voltage across the load 10 and the $V_{OC}$ 1703 remain at a constant value. As can be seen from the graph, as the phase delay angle θ 1803 increases, the output power increases to a high value limited only by non-ideal component properties. Conversely, as the phase delay angle θ 1803 decreases, the output power falls to zero. This relationship is only valid when the phase delay angle θ 1803 is within the range of zero degrees to 90 degrees. A phase delay angle θ 1803 of greater than 90 degrees will operate differently.

Figure 22:
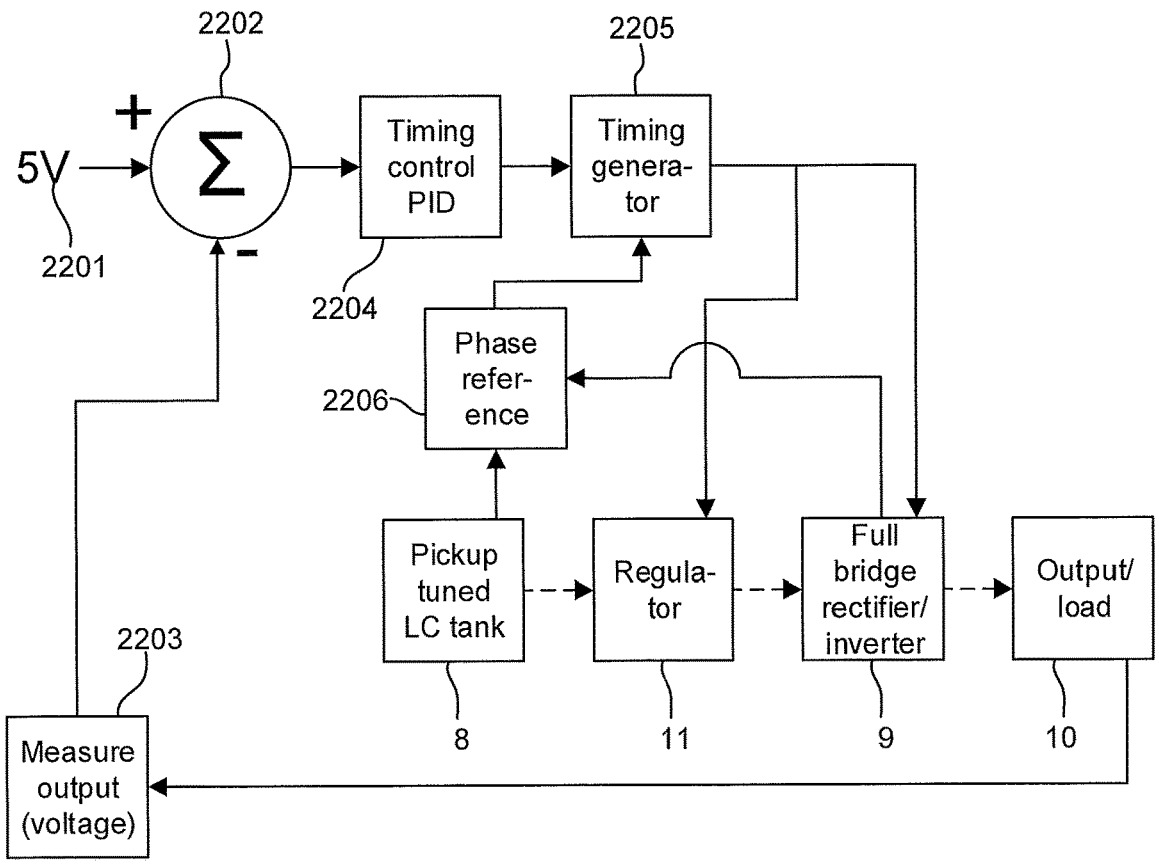
FIG. 22 is a diagram of a controller.

A control diagram for a controller 7 that uses a phase delay to control the output voltage to the load 10 is shown in FIG. 22. A voltage set point 2201 is provided and may be in any form such as an electronic voltage reference or a stored value inside a microcontroller. This voltage set point 2201 is compared using differential amplifier 2202 with a measurement of the output voltage across the load 10. The measurement of the output voltage is taken by voltmeter 2203. A proportional-integral-differential (PID) controller 2204 is used to generate a signal corresponding to the desired value for the phase delay angle θ 1803. Though a PID controller 2004 is used in this example, proportional-integral (PI) controllers, gain scheduled PID controllers and non-linear controllers may also be used, as well as other controller types. The output from the PID controller 2204 is fed into the timing generator 2205. This circuit block creates gate drive timing signals for the power regulation circuit 11 and optionally also for the power conditioning circuitry 9. The power conditioning circuitry 9 may have switches for synchronous rectification and in addition to being driven as a synchronous rectifier may be driven with some other switch timing in order to further control the output voltage. For example by changing the switch timing of the power conditioning circuitry 9 it is possible to reduce the time taken for the output voltage across the load 10 to converge at the desired voltage following transients in the operating conditions of the IPT system 1. The timing generator 2205 uses one or more phase synchronization signals from a phase reference 2206. The phase reference can use measurements of one or more parts of the inductive power receiver 3 to generate its outputs. For example as shown in the diagram it can use a combination of the rectifier input voltage 1702, the rectifier input current or a voltage or current measured from within the power receiving circuitry 8 or elsewhere within the inductive power receiver 3.

It was observed that in some cases if the created voltage 1701 gets too large the inductive power receiver 3 may become unstable. A large created voltage 1701 may happen as a result of a light load 10 or excessive $V_{OC}$ 1703. When the inductive power receiver 3 becomes unstable, the output voltage to the load 10 may swing positive and/or negative and may fall out of regulation. Additionally, the voltage and current ratings on other components within the inductive power receiver 3 and even the inductive power transmitter 2 may be exceeded. While this phenomena can affect any type of inductive power receiver 3, it can be a particular problem with power regulation circuits 11 which generate a voltage or a current to oppose an induced voltage $V_{OC}$ 1703 or an induced current.

A possible solution for improving the stability of the inductive power transfer system 3 is to decrease the amount of voltage or current that the power regulation circuit 11 needs to generate in order to control the output power to the load 10. An effective way to achieve this is to provide a coarse method of regulation in addition to the fine regulation already provided by the power regulation circuit 11. In this way regulator types which would have otherwise been too coarse, too slow or otherwise unsuitable to wireless power receivers 3 can now be used.

Figure 23:
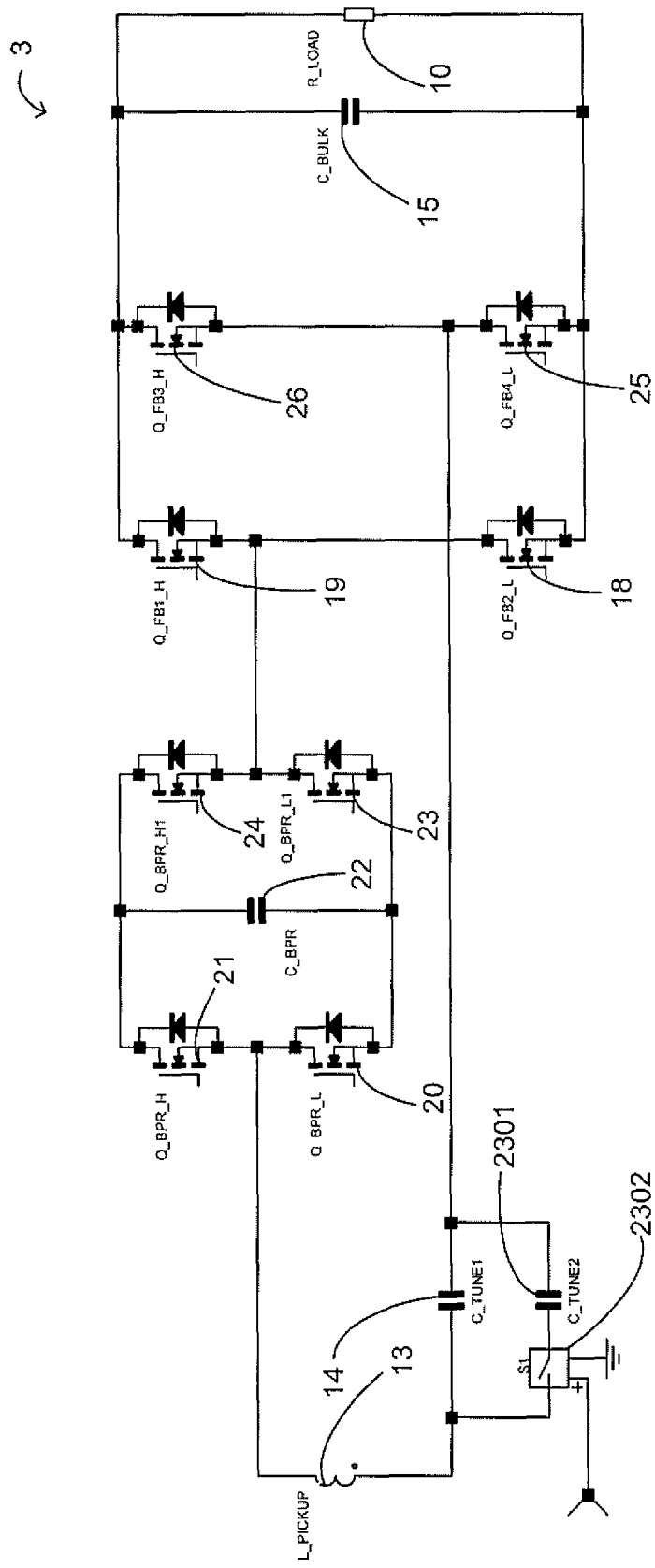
FIG. 23 shows an inductive power receiver with selective tuning/detuning circuitry for adding/removing reactance in series or parallel with parts of the power receiving circuitry.

A particularly compact yet efficient way of providing coarse regulation to the inductive power receiver 3 is to selectively tune or detune the power receiving circuitry 8. This can be done by adding and removing reactance in series or in parallel with parts of the power receiving circuitry 8. An example of this is shown in FIG. 23 where a switchable capacitor 2301 is in series with a switch 2302 that is controlled by the controller 7. This switchable capacitor 2301 can serve as such a variable reactance in combination with the receiving coil 13 and the resonance capacitor 14. When the switch 2302 is turned on by the controller 7, the switchable capacitor 2301 is added into the circuit and when the switch is tuned off, the switchable capacitor 2301 is removed. The switchable capacitor 2301 will typically be switched at a much lower frequency than the operating frequency of the inductive power transmitter 2 and in some situations may stay in a given state for several minutes or longer. More than one switchable capacitor 2302 may be used in order to increase the number of different set-points that the coarse regulation system can achieve.

Several different circuit parameters can be used to trigger when the switch 2302 should change state. For example, the size of the high rail DC bus voltage or the phase delay angle θ 1803 may be used. Alternately, the vectors of FIG. 19 can be used to provide additional information about the operating state of the inductive power receiver 3 and can help the controller 7 determine when to change the state of the switch 2302.

It may be advantageous for the power receiving circuitry 8 to be designed to be deliberately out of tune when the switch 2302 is OFF. For example, the power receiving circuitry 8 may be tuned to a higher frequency than the operating frequency of the transmitter 2 when the switchable capacitor 2301 is not in the circuit. Because many common types of switches are in their OFF state when the applied control voltage or current is zero, many types of switches will initially be in the OFF state while the controller 7 is starting up. In this way, the power receiving circuitry 8 will start up out of tune and therefore the power regulation circuit 11 will start up in a stable state. If more output power is needed later, the switch 2302 can be turned on and the switchable capacitor 2301 can be brought into the circuit, bringing the power receiving circuitry 8 into tune.

An inductive power receiver 3 may be hottest when the load 10 draws the maximum rated power. It may be advantageous for the power receiving circuitry 8 have excess capacitance when the switchable capacitor 2301 is in use. This excess capacitance can then be removed to bring the power receiving circuitry 8 into tune as more power output is required by the load 10. This approach has the advantage that at maximum output power, when the current through the receiving coil 13 is at its maximum, the switch 2302 is switched OFF and is therefore not a significant source of power loss and heat generation.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power receiver for an inductive power transfer system comprising:
   a power pick up stage including a receiving coil for receiving power transmitted by a transmitter;
   a load stage having a rectifier coupled to the power pick up stage;
   a power regulation stage configured to provide a series voltage coupled between the power regulation stage and the rectifier, the series voltage being free to vary independently from an output voltage across a load coupled to the load stage, wherein the series voltage switches between at least a first amplitude that adds to a voltage associated with the power pick up stage and a second amplitude that is different from the first amplitude and subtracts from the voltage associated with the power pick up stage; and
   a controller configured to control series voltage provided by the power regulation stage to regulate the power delivered to the load stage.

2. The receiver in claim 1 wherein the rectifier is a half bridge rectifier, a full bridge rectifier, or a half bridge converter in parallel with a capacitor.

3. The receiver in claim 2, wherein the rectifier comprises switching devices, and wherein the controller is configured to dynamically control the switching devices of the rectifier.

4. The receiver in claim 1 wherein the amplitude of the DC voltage is different from both the first amplitude and the second amplitude, the difference is at least 2V between the amplitude of the DC voltage and the first amplitude and at least 2V between the amplitude of the DC voltage and the second amplitude, and/or at least one of the first amplitude and the second amplitude is less than 2V in magnitude.

5. The receiver in claim 2 wherein the half bridge converter is switched substantially in synchronism with an AC power signal induced in the receiving coil.

6. The receiver in claim 2 wherein the series voltage is controlled based on a voltage or current from the power pick up stage.

7. The receiver in claim 2 wherein the power pick up stage further includes a resonant tuned capacitor and the series voltage is controlled based on the resonant tuned capacitor voltage.

8. The receiver in claim 7 wherein the controller is configured to compare the resonant tuned capacitor voltage against two or more thresholds and to control the rectifier determine the conduction timing of the switching devices based on the comparison.

9. The receiver in claim 8 wherein the thresholds are adjusted to vary the series voltage, and thereby vary the power delivered to the load stage.

10. The receiver in claim 1 wherein the controller is configured to regulate the power delivered based on a phase reference signal.

11. The receiver in claim 10 wherein a time delay between the phase reference signal and a control signal is selected by the controller.

12. The receiver in claim 10 wherein the phase reference is configured to measure the phase of a voltage that appears across the load stage.

13. The receiver in claim 11 wherein an increase in the time delay results in a decrease in the power delivered to the load stage.

14. The receiver in claim 1 wherein the series voltage varies periodically with a fundamental frequency that is on average the same as the transmitter operating frequency.

15. The receiver in claim 1 configured for integration into a cellular phone for charging from a charging mat using inductive power transfer.

* * * * *